United States Patent
Panzica et al.

(10) Patent No.: US 10,824,162 B2
(45) Date of Patent: Nov. 3, 2020

(54) LOW QUALITY POSE LANE ASSOCIATOR

(71) Applicant: UATC, LLC, San Francisco, CA (US)

(72) Inventors: Adam Cole Panzica, Pittsburgh, PA (US); Brett Bavar, Glenshaw, PA (US)

(73) Assignee: UATC, LLC, San Francisco, CA (US)

( * ) Notice: Subject to any disclaimer, the term of this patent is extended or adjusted under 35 U.S.C. 154(b) by 153 days.

(21) Appl. No.: 15/914,713

(22) Filed: Mar. 7, 2018

(65) Prior Publication Data
US 2019/0204849 A1 Jul. 4, 2019

Related U.S. Application Data

(60) Provisional application No. 62/613,248, filed on Jan. 3, 2018, provisional application No. 62/613,273, filed on Jan. 3, 2018.

(51) Int. Cl.
*G05D 1/02* (2020.01)
*G08G 1/133* (2006.01)
(Continued)

(52) U.S. Cl.
CPC .......... *G05D 1/0274* (2013.01); *G01C 21/36* (2013.01); *G01S 17/06* (2013.01); *G01S 17/89* (2013.01);
(Continued)

(58) Field of Classification Search
CPC .. G05D 1/0088; G05D 1/0274; G05D 1/0248; G05D 1/0231; G05D 1/024;
(Continued)

(56) References Cited

U.S. PATENT DOCUMENTS 8,452,535 B2 * 5/2013 Zeng ..................... B60W 30/12
701/466
9,063,548 B1 * 6/2015 Ferguson ........... G06K 9/00798
(Continued)

OTHER PUBLICATIONS

"U.S. Appl. No. 15/914,740, Notice of Allowance dated Sep. 23, 2019", 17 pgs.

*Primary Examiner* — Behrang Badii
(74) *Attorney, Agent, or Firm* — Schwegman Lundberg & Woessner, P.A.

(57) ABSTRACT

An autonomous vehicle (AV) includes a vehicle computing system including one or more processors configured to receive map data associated with a map of a geographic location, receive pose data based on a pose estimate associated with a location of the autonomous vehicle, determine, based on the pose data, that the autonomous vehicle is on a coverage lane, and, in response to determining that the autonomous vehicle is on the coverage lane, determine one or more candidate lanes, generate a route plan, based on the one or more candidate lanes and a current lane, and control travel of the autonomous vehicle on the route plan. The map includes (i) a coverage lane where the autonomous vehicle can travel under a partially-autonomous mode or a manual mode, and (ii) an AV lane where the autonomous vehicle can travel under a fully-autonomous mode. The autonomous vehicle configured to determine a pose estimate in a submap of a plurality of submaps where an autonomous vehicle can travel.

20 Claims, 16 Drawing Sheets

(51) Int. Cl.

| | | |
|---|---|---|
| *G01S 17/931* | (2020.01) | |
| *G01C 21/36* | (2006.01) | |
| *G01S 17/06* | (2006.01) | |
| *G01S 17/89* | (2020.01) | |
| *G05D 1/00* | (2006.01) | |
| G06T 7/73 | (2017.01) | |
| G01C 21/30 | (2006.01) | |
| G01C 21/32 | (2006.01) | |
| G01C 21/34 | (2006.01) | |
| G06T 7/70 | (2017.01) | |
| G06K 9/00 | (2006.01) | |
| G06T 19/20 | (2011.01) | |

(52) U.S. Cl.
CPC .......... *G01S 17/931* (2020.01); *G05D 1/0088* (2013.01); *G05D 1/027* (2013.01); *G05D 1/0212* (2013.01); *G05D 1/0238* (2013.01); *G05D 1/0278* (2013.01); *G08G 1/133* (2013.01); *G01C 21/30* (2013.01); *G01C 21/32* (2013.01); *G01C 21/34* (2013.01); *G05D 1/00* (2013.01); *G05D 1/02* (2013.01); *G05D 1/0248* (2013.01); *G05D 2201/0212* (2013.01); *G06K 9/00* (2013.01); *G06T 7/70* (2017.01); *G06T 7/74* (2017.01); *G06T 19/20* (2013.01)

(58) Field of Classification Search
CPC .. G05D 1/0246; G05D 1/0212; G05D 1/0238; G05D 1/027; G05D 1/0278; G05D 1/02; G05D 2201/0212; G06T 7/74; G06T 7/70; G06T 19/20; G01S 13/931; G01S 13/723; G01S 13/867; G01S 7/22; G01S 19/48; G01S 19/50; G01S 17/931; G01S 17/06; G01S 17/89; G06K 9/00798; G06K 9/00805; G06K 9/629; B60W 30/12; B60W 40/06; G01C 21/367; G01C 21/005; G01C 21/365; G01C 21/30; G01C 21/34; G01C 21/3407; G01C 21/32; G01C 21/36; G02B 27/01; G08G 1/167; G08G 1/165; G08G 1/168; G08G 1/166; G08G 1/133; B60R 1/00; B60Q 1/50; G06F 16/29

See application file for complete search history.

(56) References Cited

U.S. PATENT DOCUMENTS

| | | | |
|---|---|---|---|
| 10,551,850 | B2 | 2/2020 | Panzica et al. |
| 2010/0253540 | A1* | 10/2010 | Seder ........................ B60R 1/00 |
| | | | 340/905 |
| 2018/0225968 | A1 | 8/2018 | Wang |
| 2019/0064814 | A1 | 2/2019 | Pandit et al. |
| 2019/0073542 | A1* | 3/2019 | Sattar ........................ G06T 7/74 |
| 2019/0137287 | A1 | 5/2019 | Pazhayampallil et al. |
| 2019/0143967 | A1 | 5/2019 | Kutila et al. |
| 2019/0204088 | A1 | 7/2019 | Haque et al. |
| 2019/0204850 | A1 | 7/2019 | Panzica et al. |
| 2019/0258251 | A1* | 8/2019 | Ditty ................... G05D 1/0088 |

* cited by examiner

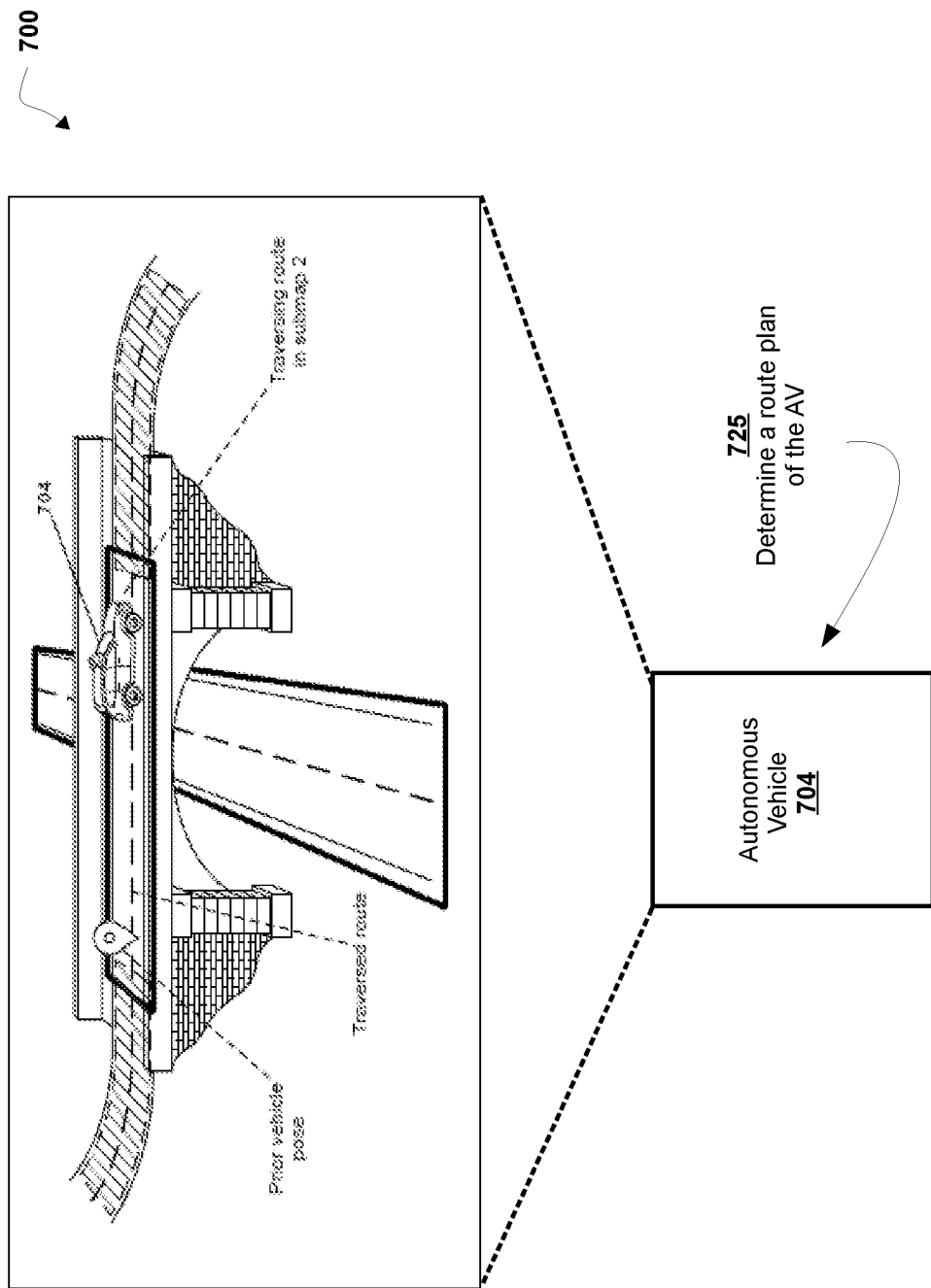

LOW QUALITY POSE LANE ASSOCIATOR

CROSS REFERENCE TO RELATED APPLICATION

This application claims the benefit of U.S. Provisional Application Nos. 62/613,248 and 62/613,273, filed Jan. 3, 2018, the entire disclosure of which is hereby incorporated by reference in its entirety.

BACKGROUND

An autonomous vehicle (AV) (e.g., a driverless car, a driverless auto, a self-driving car, a robotic car, etc.) is a vehicle that is capable of sensing an environment of the vehicle and traveling (e.g., navigating, moving, etc.) in the environment without human input. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

SUMMARY

According to some non-limiting embodiments or aspects, provided is an autonomous vehicle including a vehicle computing system including one or more processors, the vehicle computing system configured to: receive map data associated with a map of a geographic location, the map comprising a plurality of submaps where an autonomous vehicle can travel, the plurality of submaps comprising one or more roadways; obtain position estimate data associated with a position estimate of the autonomous vehicle in the geographic location; determine a route of the autonomous vehicle including a subset of submaps in the plurality of submaps; determine a first submap in the subset of submaps of the route closest to the position estimate of the autonomous vehicle; determine a second submap outside the subset of submaps of the route closest to the position estimate of the autonomous vehicle; determine a distance between the position estimate of the autonomous vehicle and a submap associated with a prior pose of the autonomous vehicle; determine a vehicle pose relative to the first submap or the second submap based on the distance; and control travel of the autonomous vehicle based on the vehicle pose.

In some non-limiting embodiments or aspects, the vehicle computing system, when determining the vehicle pose relative to the first submap or the second submap, is further configured to determine that the first submap satisfies a threshold based on the distance between the position estimate of the autonomous vehicle and the submap associated with the prior pose; determine a projection point associated with the first submap; and determine a vehicle pose in the first submap based on the position estimate data and the projection point.

In some non-limiting embodiments or aspects, the vehicle computing system, when determining a pose of the autonomous vehicle in the first submap, is further configured to determine a roadway segment including the vehicle pose in the first submap based on the map data where the autonomous vehicle can travel under a non-autonomous mode.

In some non-limiting embodiments or aspects, the vehicle computing system, when determining the vehicle pose relative to a submap, is further configured to determine that the first submap does not satisfy a threshold based on the distance between the position estimate of the autonomous vehicle and the submap associated with the prior pose; and in response to determining the first submap does not satisfy the threshold, the one or more processor are configured to determine a projection point associated with the second submap; and determine a vehicle pose in the second submap based on the position estimate data and the projection point.

In some non-limiting embodiments or aspects, determining a distance between the position estimate of the autonomous vehicle and a submap associated with a prior vehicle pose of the autonomous vehicle is based on at least one or more of the following: a number of transitions of the autonomous vehicle between submaps, a distance of a route between the position estimate of the autonomous vehicle and the submap associated with the prior vehicle pose, and a centroid of a submap associated with the prior vehicle pose.

In some non-limiting embodiments or aspects, the vehicle computing system is further configured to determine orientation information based on map data associated with one or more transitions between a submap associated with the prior pose of the autonomous vehicle and a submap of the vehicle pose of the autonomous vehicle.

In some non-limiting embodiments or aspects, the orientation information is associated with an indication of a travel direction for the autonomous vehicle in the submap; and the vehicle pose is non-viable when a submap of the vehicle pose has a travel direction that is different than a prior travel direction of the autonomous vehicle.

In some non-limiting embodiments or aspects, the position estimate data includes at least one of latitude, longitude and altitude coordinates, and coordinated time coordinates.

According to some non-limiting embodiments or aspects, provided is a method including receiving, with a computer system comprising one or more processors, map data associated with a map of a geographic location, the map comprising a plurality of submaps where an autonomous vehicle can travel, the plurality of submaps comprising one or more roadways; obtaining, with the computer system, position estimate data associated with a position estimate of the autonomous vehicle in the geographic location; determining, with the computer system, a route of an autonomous vehicle including a subset of submaps in the plurality of submaps; determining, with the computer system, a first submap in the subset of submaps of the route closest to the position estimate of the autonomous vehicle; determining, with the computer system, a second submap outside the subset of submaps of the route closest to the position estimate of the autonomous vehicle; determining, with the computer system, a distance between the position estimate of the autonomous vehicle and a submap associated with a prior pose of the autonomous vehicle; determining, with the computer system, a vehicle pose relative to the first submap or the second submap based on the distance; and controlling the autonomous vehicle on a submap of the map based on the vehicle pose.

In some non-limiting embodiments or aspects, when determining the vehicle pose relative to the first submap or the second submap, the method includes determining that the first submap satisfies a threshold based on the distance between the position estimate of the autonomous vehicle and the submap associated with the prior pose; determining a projection point associated with the first submap; and determining a vehicle pose in the first submap based on the position estimate data and the projection point.

In some non-limiting embodiments or aspects, the map data is associated with a location of the autonomous vehicle in the submap in a subset of submaps of the route, and the method further includes determining a roadway segment including the vehicle pose in the first submap based on the map data where the autonomous vehicle can travel under a non-autonomous mode.

In some non-limiting embodiments or aspects, determining the vehicle pose relative to a submap further includes determining that the first submap does not satisfy a threshold based on the distance between the position estimate of the autonomous vehicle and the submap associated with the prior pose; and in response to determining the first submap does not satisfy the threshold, determining a projection point associated with the second submap; and determining a vehicle pose in the second submap based on the position estimate data and the projection point.

In some non-limiting embodiments or aspects, determining a distance between the position estimate of the autonomous vehicle and a submap associated with a prior vehicle pose of the autonomous vehicle is based on at least one or more of the following: a number of transitions of the autonomous vehicle between submaps; a distance of a route between the position estimate of the autonomous vehicle and the submap associated with the prior vehicle pose; a centroid of a submap associated with the prior vehicle pose, and/or any combination thereof.

In some non-limiting embodiments or aspects, when determining the vehicle pose of the autonomous vehicle, the method further includes determining orientation information based on map data associated with one or more transitions between a submap associated with the prior pose of the autonomous vehicle and a submap of the vehicle pose of the autonomous vehicle.

In some non-limiting embodiments or aspects, the orientation information is associated with an indication of a travel direction for the autonomous vehicle in the submap; and a vehicle pose is non-viable when a submap of the vehicle pose has a travel direction that is different than a prior travel direction of the autonomous vehicle.

According to some non-limiting embodiments or aspects, provided is a vehicle computing system including one or more processors configured to: receive map data associated with a map of a geographic location, the map comprising a plurality of submaps where an autonomous vehicle can travel, the plurality of submaps comprising one or more roadways; obtain position estimate data associated with a position estimate of the autonomous vehicle in the geographic location; determine a route of the autonomous vehicle including a subset of submaps in the plurality of submaps; determine a first submap in the subset of submaps of the route closest to the position estimate of the autonomous vehicle; determine a second submap outside the subset of submaps of the route closest to the position estimate of the autonomous vehicle; determine a distance between the position estimate of the autonomous vehicle and a submap associated with a prior pose of the autonomous vehicle; determine a vehicle pose relative to the first submap or the second submap based on the distance; and control travel of the autonomous vehicle based on the vehicle pose.

In some non-limiting embodiments or aspects, the one or more processors, when determining the vehicle pose relative to a submap, are further configured to: determine that the first submap satisfies a threshold based on the distance between the position estimate of the autonomous vehicle and the submap associated with the prior pose; determine a projection point associated with the first submap; and determine a vehicle pose in first submap based on the position estimate data and the projection point.

In some non-limiting embodiments or aspects, the one or more processor are further configured to determine a distance between the position estimate of the autonomous vehicle and a submap associated with a prior location of the autonomous vehicle, is based on at least one or more of the following: a number of transitions of the autonomous vehicle between submaps; a distance of a route between the position estimate of the autonomous vehicle and the submap associated with the prior vehicle pose; and a centroid of a submap associated with the prior vehicle pose.

In some non-limiting embodiments or aspects, the one or more processors, when determining a vehicle pose relative to a submap, are further configured to determine that the first submap does not satisfy a threshold based on the distance between the position estimate of the autonomous vehicle and the submap associated with the prior pose; and in response to determining the first submap does not satisfy the threshold, determine a projection point associated with the second submap; and determine a vehicle pose in the second submap based on the position estimate data and the projection point.

In some non-limiting embodiments or aspects, when determining the vehicle pose of the autonomous vehicle, the one or more processors are configured to determine orientation information based on map data associated with one or more transitions between a submap associated with the prior pose of the autonomous vehicle and a submap of the vehicle pose of the autonomous vehicle.

According to some non-limiting embodiments or aspects, provided is an autonomous vehicle including a vehicle computing system including one or more processors, the vehicle computing system configured to: receive map data associated with a map of a geographic location, the map comprising (i) one or more coverage lanes where the autonomous vehicle can travel under a partially-autonomous mode or a manual mode, and (ii) one or more AV lanes where the autonomous vehicle can travel under a fully-autonomous mode; receive pose data based on a pose estimate associated with a location of the autonomous vehicle in the geographic location; determine one or more candidate lanes within a distance of the pose estimate associated with the autonomous vehicle; select, based on a score, a starting lane from the one or more candidate lanes; generate a route plan that includes the selected starting lane; and control travel of the autonomous vehicle based on one of the at least one route plan.

In some non-limiting embodiments or aspects, the vehicle computing system is further configured to: determine based on the starting lane that the autonomous vehicle is on the coverage lane; and control travel of the autonomous vehicle based on the route plan, by controlling the autonomous vehicle in a coverage lane where the autonomous vehicle can travel under a partially-autonomous mode or a manual mode.

In some non-limiting embodiments or aspects, the vehicle computing system is further configured to: receive updated pose data based on a Light Detection and Ranging (LIDAR) pose estimate associated with a location of the autonomous vehicle in the geographic location; determine one or more updated candidate lanes within a distance of the LIDAR pose estimate associated with the autonomous vehicle select, based on a second score, a second starting lane from the one or more updated candidate lanes, in response to determining that the updated candidate lanes are not in the route plan; determine, based on the selected second starting lane, that the autonomous vehicle is on the AV lane; generate an updated route plan that includes the second selected starting lane and control travel of the autonomous vehicle based on the updated route plan in the fully-autonomous mode.

In some non-limiting embodiments, the map data is associated with an indication for each lane in the geographic location of a travel direction for the autonomous vehicle in said lane, and the vehicle computing system is further configured to: for each respective candidate lane of the one or more candidate lanes, determine that a respective candidate lane is non-viable in response to determining that said respective candidate lane includes: a travel direction that is different by more than a predetermined degree from the starting lane of the autonomous vehicle, a lateral distance greater than a threshold distance, a vertical distance greater than a threshold distance, or any combination thereof; and select, based on a score, by selecting a starting lane from the one or more candidate lanes, excluding candidate lanes that are non-viable.

In some non-limiting embodiments or aspects, the score for selecting a starting lane is a weighted sum of: (i) a distance score based on the distance between a position of the autonomous vehicle and a closest point of the candidate lanes driving path, (ii) a heading score based on the difference between a heading of the autonomous vehicle and a heading at the closest point in a driving path of the candidate lane, and (iii) a route score based on the candidate lane including the starting lane of the autonomous vehicle and/or one of the one or more candidate future lanes in the route of the autonomous vehicle.

In some non-limiting embodiments or aspects, the vehicle computing system is configured to control the autonomous vehicle to transition from a pose estimate of the autonomous vehicle in a coverage lane to a LIDAR pose of the autonomous vehicle in the AV lane.

In some non-limiting embodiments or aspects, the vehicle computing system is configured to control the autonomous vehicle to transition from the selected starting lane in the coverage lane to a future lane in the AV lane in the one or more candidate lanes.

In some non-limiting embodiments or aspects, the vehicle computing system, is configured to: generate a score for the one or more candidate lanes; and select the starting lane of the autonomous vehicle from the one or more candidate lanes based at least in part on the highest score.

In some non-limiting embodiments or aspects, the vehicle computing system is configured to: determine one or more future lanes of the autonomous vehicle from the one or more candidate lanes; and generate the route plan comprising a transition from the selected starting lane to at least one of the one or more future lanes.

According to some non-limiting embodiments or aspects, provided is a method including receiving, with a computer system comprising one or more processors, map data associated with a map of a geographic location, the map comprising (i) one or more coverage lanes where the autonomous vehicle can travel under a partially-autonomous mode or a manual mode, and (ii) one or more AV lanes where the autonomous vehicle can travel under a fully-autonomous mode; receiving, with the computer system, pose data based on a pose estimate associated with a location of the autonomous vehicle in the geographic location; determining one or more candidate lanes within a distance of the pose estimate associated with the autonomous vehicle; selecting, with the computer system, based on a score, a starting lane from the one or more candidate lanes; generating, with the computer system, a route plan that includes the selected starting lane; and controlling, with the computer system, travel of the autonomous vehicle based on the route plan.

In some non-limiting embodiments or aspects, the method includes receiving, with the computer system, updated pose data based on a LIDAR pose estimate associated with a location of the autonomous vehicle in the geographic location; determining, with the computer system, one or more updated candidate lanes within a distance of the LIDAR pose estimate associated with the autonomous vehicle selecting, with the computer system, based on a second score, a second starting lane from the one or more updated candidate lanes, in response to determining that the updated candidate lanes are not in the route plan; determining, with the computer system, based on the selected second starting lane, that the autonomous vehicle is on the AV lane; generating, with the computer system, an updated route plan that includes the second selected starting lane; and controlling travel of the autonomous vehicle, with the computer system, based on the updated route plan in the fully-autonomous mode.

In some non-limiting embodiments or aspects the map data is associated with an indication for each lane in the geographic location of a travel direction for the autonomous vehicle in said lane, the method further comprising: for each respective candidate lane of the one or more candidate lanes, determining, with the computer system, that a respective candidate lane is non-viable in response to determine that said respective candidate lane includes: a travel direction that is different by more than a predetermined degree from the starting lane of the autonomous vehicle; and selecting, with the computer system, based on a score, by selecting a starting lane from the one or more candidate lanes excluding candidate lanes that are non-viable.

In some non-limiting embodiments or aspects, the score for selecting a starting lane is a weighted sum of: (i) a distance score based on the distance between a position of the autonomous vehicle and a closest point of the candidate lanes driving path, (ii) a heading score based on the difference between a heading of the autonomous vehicle and a heading at the closest point in a driving path of the candidate lane, and (iii) a route score based on the candidate lane including the starting current lane of the autonomous vehicle and/or one of the one or more candidate future lanes in the route of the autonomous vehicle.

In some non-limiting embodiments or aspects, the method includes controlling the vehicle to transition from a pose estimate of the autonomous vehicle in a coverage lane to a LIDAR pose of the autonomous vehicle in the AV lane.

In some non-limiting embodiments or aspects, the method includes controlling the vehicle to transition from the selected starting lane in the coverage lane to a future lane in the AV lane in the one or more candidate lanes.

In some non-limiting embodiments or aspects, the method further includes: generating a score for the one or more candidate lanes; and selecting the starting lane of the autonomous vehicle from the one or more candidate lanes based at least in part on the highest score.

In some non-limiting embodiments or aspects, the method includes determining, with the computer system, one or more future lanes of the autonomous vehicle from the one or more candidate lanes; and determining, with the computer system, the route plan comprising a transition from the selected starting lane to at least one of the one or more future lanes.

According to some non-limiting embodiments or aspects, provided is a computing system including one or more processors programmed or configured to: receive map data associated with a map of a geographic location, the map comprising (i) one or more coverage lanes where the autonomous vehicle can travel under a partially-autonomous mode or a manual mode, and (ii) one or more AV lanes where the autonomous vehicle can travel under a fully-autonomous mode; receive pose data based on a pose estimate associated with a location of the autonomous vehicle in the geographic location; determine one or more candidate lanes within a distance of the pose estimate associated with the autonomous vehicle; select, based on a score, a starting lane from the one or more updated candidate lanes, in response to determining that the updated candidate lanes are not in the route plan; generate a route plan that includes the selected starting lane; and control travel of the autonomous vehicle based on the route plan.

In some non-limiting embodiments or aspects, the one or more processors are further configured to: receive updated pose data based on a LIDAR pose estimate associated with a location of the autonomous vehicle in the geographic location; determine one or more updated candidate lanes within a distance of the LIDAR pose estimate associated with autonomous vehicle select, based on a second score, a second starting lane from the one or more candidate lanes; determine, based on the selected second starting lane, that the autonomous vehicle is on the AV lane; generate an updated route plan that includes the second selected starting lane; and control travel of the autonomous vehicle on the route plan based on the updated route plan in the fully-autonomous mode.

Further non-limiting embodiments or aspects are set forth in the following numbered clauses:

Clause 1. An autonomous vehicle comprising: a vehicle computing system comprising one or more processors, wherein the vehicle computing system is configured to: receive map data associated with a map of a geographic location, the map comprising a plurality of submaps where an autonomous vehicle can travel, the plurality of submaps comprising one or more roadways; obtain position estimate data associated with a position estimate of the autonomous vehicle in the geographic location; determine a route of the autonomous vehicle including a subset of submaps in the plurality of submaps; determine a first submap in the subset of submaps of the route closest to the position estimate of the autonomous vehicle; determine a second submap outside the subset of submaps of the route closest to the position estimate of the autonomous vehicle; determine a distance between the position estimate of the autonomous vehicle and a submap associated with a prior pose of the autonomous vehicle; determine a vehicle pose relative to the first submap or the second submap based on the distance; and control travel of the autonomous vehicle based on the vehicle pose.

Clause 2. The autonomous vehicle of clause 1, wherein the vehicle computing system is further configured to, when determining the vehicle pose relative to the first submap or the second submap, determine that the first submap satisfies a threshold based on the distance between the position estimate of the autonomous vehicle and the submap associated with the prior pose; determine a projection point associated with the first submap; and determine a vehicle pose in first submap based on the position estimate data and the projection point.

Clause 3. The autonomous vehicle of any of clauses 1 and 2, wherein the vehicle computing system, when determining a pose of the autonomous vehicle in the first submap, is further configured to: determine a roadway segment including the vehicle pose in the first submap based on the map data where the autonomous vehicle can travel under a non-autonomous mode.

Clause 4. The autonomous vehicle of any of clauses 1-3, wherein the vehicle computing system, when determining the vehicle pose relative to a submap, is further configured to: determine that the first submap does not satisfy a threshold based on the distance between the position estimate of the autonomous vehicle and the submap associated with the prior pose; and in response to determining the first submap does not satisfy the threshold: determine a projection point associated with the second submap; and determine a vehicle pose in the second submap based on the position estimate data and the projection point.

Clause 5. The autonomous vehicle of any of clauses 1-4, wherein determining a distance between the position estimate of the autonomous vehicle and a submap associated with a prior vehicle pose of the autonomous vehicle is based on at least one or more of the following: a number of transitions of the autonomous vehicle between submaps; a distance of a route between the position estimate of the autonomous vehicle and the submap associated with the prior vehicle pose; and a centroid of a submap associated with the prior vehicle pose.

Clause 6. The autonomous vehicle of any of clauses 1-5, wherein the vehicle computing system is further configured to determine orientation information based on map data associated with one or more transitions between a submap associated with the prior pose of the autonomous vehicle and a submap of the vehicle pose of the autonomous vehicle.

Clause 7. The autonomous vehicle of any of clauses 1-6, wherein: the orientation information is associated with an indication of a travel direction for the autonomous vehicle in the submap; and the vehicle pose is non-viable when a submap of the vehicle pose has a travel direction that is different than a prior travel direction of the autonomous vehicle.

Clause 8. The autonomous vehicle of any of clauses 1-7, wherein the position estimate data includes at least one of latitude, longitude and altitude coordinates, and coordinated time coordinates.

Clause 9. A method comprising: receiving, with a computer system comprising one or more processors, map data associated with a map of a geographic location, the map comprising a plurality of submaps where an autonomous vehicle can travel, the plurality of submaps comprising one or more roadways; obtaining, with the computer system, position estimate data associated with a position estimate of the autonomous vehicle in the geographic location; determining, with the computer system, a route of an autonomous vehicle including a subset of submaps in the plurality of submaps; determining, with the computer system, a first submap in the subset of submaps of the route closest to the position estimate of the autonomous vehicle; determining, with the computer system, a second submap outside the subset of submaps of the route closest to the position estimate of the autonomous vehicle; determining, with the computer system, a distance between the position estimate of the autonomous vehicle and a submap associated with a prior pose of the autonomous vehicle; determining, with the computer system, a vehicle pose relative to the first submap or the second submap based on the distance; and controlling the autonomous vehicle on a submap of the map based on the vehicle pose.

Clause 10. The method of clause 1 further comprising, when determining the vehicle pose relative to the first submap or the second submap: determining that the first submap satisfies a threshold based on the distance between the position estimate of the autonomous vehicle and the submap associated with the prior pose; determining a projection point associated with the first submap; and determining a vehicle pose in first submap based on the position estimate data and the projection point.

Clause 11. The method of any of clauses 9 and 10, wherein the map data is associated with a location of the autonomous vehicle in the submap in a subset of submaps of the route, the method further comprising: determining a roadway segment including the vehicle pose in the first submap based on the map data where the autonomous vehicle can travel under a non-autonomous mode.

Clause 12. The method of any of clauses 9-11, wherein determining the vehicle pose relative to a submap comprises: determining that the first submap does not satisfy a threshold based on the distance between the position estimate of the autonomous vehicle and the submap associated with the prior pose; and in response to determining the first submap does not satisfy the threshold: determining a projection point associated with the second submap; and determining a vehicle pose in the second submap based on the position estimate data and the projection point.

Clause 13. The method of any of clauses 9-12, wherein determining a distance between the position estimate of the autonomous vehicle and a submap associated with a prior vehicle pose of the autonomous vehicle, is based on at least one or more of the following: a number of transitions of the autonomous vehicle between submaps; a distance of a route between the position estimate of the autonomous vehicle and the submap associated with the prior vehicle pose; and a centroid of a submap associated with the prior vehicle pose.

Clause 14. The method of any of clauses 9-13, when determining the vehicle pose of the autonomous vehicle, determining orientation information based on map data associated with one or more transitions between a submap associated with the prior pose of the autonomous vehicle and a submap of the vehicle pose of the autonomous vehicle.

Clause 15. The method of any of clauses 9-14, wherein the orientation information is associated with an indication of a travel direction for the autonomous vehicle in the submap; and a vehicle pose is non-viable when a submap of the vehicle pose has a travel direction that is different than a prior travel direction of the autonomous vehicle.

Clause 16. A computing system comprising: one or more processors configured to: receive map data associated with a map of a geographic location, the map comprising a plurality of submaps where an autonomous vehicle can travel, the plurality of submaps comprising one or more roadways; obtain position estimate data associated with a position estimate of the autonomous vehicle in the geographic location; determine a route of the autonomous vehicle including a subset of submaps in the plurality of submaps; determine a first submap in the subset of submaps of the route closest to the position estimate of the autonomous vehicle; determine a second submap outside the subset of submaps of the route closest to the position estimate of the autonomous vehicle; determine a distance between the position estimate of the autonomous vehicle and a submap associated with a prior pose of the autonomous vehicle; determine a vehicle pose relative to the first submap or the second submap based on the distance; and control travel of the autonomous vehicle based on the vehicle pose.

Clause 17. The computing system of clause 16, wherein the one or more processors, when determining the vehicle pose relative to a submap, are further configured to: determine that the first submap satisfies a threshold based on the distance between the position estimate of the autonomous vehicle and the submap associated with the prior pose; determine a projection point associated with the first submap; and determine a vehicle pose in first submap based on the position estimate data and the projection point.

Clause 18. The computing system of any of clauses 16-17, wherein determining a distance between the position estimate of the autonomous vehicle and a submap associated with a prior location of the autonomous vehicle, is based on at least one or more of the following: a number of transitions of the autonomous vehicle between submaps; a distance of a route between the position estimate of the autonomous vehicle and the submap associated with the prior vehicle pose; and a centroid of a submap associated with the prior vehicle pose.

Clause 19. The computing system of any of clauses 16-18, wherein the one or more processors, when determining a vehicle pose relative to a submap, are further configured to: determine that the first submap does not satisfy a threshold based on the distance between the position estimate of the autonomous vehicle and the submap associated with the prior pose; and in response to determining the first submap does not satisfy the threshold: determine a projection point associated with the second submap; and determine a vehicle pose in the second submap based on the position estimate data and the projection point.

Clause 20. The computing system of any of clauses 16-19, wherein the one or more processors, when determining the vehicle pose of the autonomous vehicle, are further configured to determine orientation information based on map data associated with one or more transitions between a submap associated with the prior pose of the autonomous vehicle and a submap of the vehicle pose of the autonomous vehicle.

Clause 21. An autonomous vehicle comprising: a vehicle computing system comprising one or more processors, wherein the vehicle computing system is configured to: receive map data associated with a map of a geographic location, the map comprising (i) one or more coverage lanes where the autonomous vehicle can travel under a partially-autonomous mode or a manual mode, and (ii) one or more AV lanes where the autonomous vehicle can travel under a fully-autonomous mode; receive pose data based on a pose estimate associated with a location of the autonomous vehicle in the geographic location; determine one or more candidate lanes within a distance of the pose estimate associated with the autonomous vehicle; select, based on a score, a starting lane from the one or more candidate lanes; generate a route plan that includes the selected starting lane; and control travel of the autonomous vehicle based on one of the at least one route plan.

Clause 22. The autonomous vehicle of clause 21, wherein the vehicle computing system is further configured to: determine based on the starting lane that the autonomous vehicle is on a coverage lane; and control travel of the autonomous vehicle based on the route plan, by controlling the autonomous vehicle in a coverage lane where the autonomous vehicle can travel under a partially-autonomous mode or a manual mode.

Clause 23. The autonomous vehicle of any of clauses 21-22, wherein the vehicle computing system is further configured to: receive updated pose data based on a LIDAR pose estimate associated with a location of the autonomous vehicle in the geographic location; determine one or more updated candidate lanes within a distance of the LIDAR pose estimate associated with the autonomous vehicle select, based on a second score, a second starting lane from the one or more updated candidate lanes, in response to determining that the updated candidate lanes are not in the route plan; determine, based on the selected second starting lane, that the autonomous vehicle is on the AV lane; generate an updated route plan that includes the second selected starting lane; and control travel of the autonomous vehicle based on the updated route plan in the fully-autonomous mode.

Clause 24. The autonomous vehicle of any of clauses 21-23, wherein the map data is associated with an indication for each lane in the geographic location of a travel direction for the autonomous vehicle in said lane, the vehicle computing system is further configured to: for each respective candidate lane of the one or more candidate lanes, determine that a respective candidate lane is non-viable in response to determining that said respective candidate lane includes: a travel direction that is different by more than a predetermined degree from the starting lane of the autonomous vehicle; a lateral distance greater than a threshold distance, a vertical distance greater than a threshold distance, or any combination thereof; and select, based on a score, a starting lane from the one or more candidate lanes, by selecting a starting lane from the one or more candidate lanes, excluding candidate lanes that are non-viable.

Clause 25. The autonomous vehicle of any of clauses 21-24, wherein the score for selecting a starting lane is a weighted sum of: (i) a distance score based on the distance between a position of the autonomous vehicle and a closest point of the candidate lanes driving path, (ii) a heading score based on the difference between a heading of the autonomous vehicle and a heading at the closest point in a driving path of the of the candidate lane, and (iii) a route score based on the candidate lane including the starting lane of the AV and/or one of the one or more candidate future lanes in the route of the autonomous vehicle.

Clause 26. The autonomous vehicle of any of clauses 21-25, wherein the vehicle computing system is configured to control the vehicle to transition from a pose estimate of the autonomous vehicle in a coverage lane to a LIDAR pose of the autonomous vehicle in the AV lane.

Clause 27. The autonomous vehicle of any of clauses 21-26, wherein the vehicle computing system is configured to control the vehicle to transition from a current lane in the coverage lane based on a distance from the pose estimate associated with the autonomous vehicle to a future lane in the AV lane.

Clause 28. The autonomous vehicle of any of clauses 21-27, wherein the vehicle computing system, is configured to: generate a score for the one or more candidate lanes; and select the starting lane of the autonomous vehicle from the one or more candidate lanes based at least in part on the highest score.

Clause 29. The autonomous vehicle of any of clauses 21-28, wherein the vehicle computing system is configured to: determine one or more future lanes of the autonomous vehicle from the one or more candidate lanes; and generate the route plan comprising a transition from the selected starting lane to at least one of the one or more future lanes.

Clause 30. A method comprising: receiving, with a computer system comprising one or more processors, map data associated with a map of a geographic location, the map comprising (i) one or more coverage lanes where the autonomous vehicle can travel under a partially-autonomous mode or a manual mode, and (ii) one or more AV lanes where the autonomous vehicle can travel under a fully-autonomous mode; receiving, with the computer system, pose data based on a pose estimate associated with a location of the autonomous vehicle in the geographic location; determining one or more candidate lanes within a distance of the pose estimate associated with the autonomous vehicle; selecting, with the computer system, based on a score, a starting lane from the one or more candidate lanes; generating, with the computer system, a route plan that includes the selected starting lane; and controlling, with the computer system, travel of the autonomous vehicle based on the route plan.

Clause 31. The method of clause 30, further comprising: determining, with the computer system, based on the starting lane that the autonomous vehicle is on a coverage lane; and controlling, with the computer system, travel of the autonomous vehicle based on the route plan, by controlling the autonomous vehicle in a coverage lane where the autonomous vehicle can travel under a partially-autonomous mode or a manual mode.

Clause 32. The method of any of clauses 30-31, comprising: receiving, with the computer system, updated pose data based on a LIDAR pose estimate associated with a location of the autonomous vehicle in the geographic location; determining, with the computer system, one or more updated candidate lanes within a distance of the LIDAR pose estimate associated with the autonomous vehicle selecting, with the computer system, based on a second score, a second starting lane from the one or more updated candidate lanes, in response to determining that the updated candidate lames are not in the route plan; generating, with the computer system, an updated route plan that includes the second selected starting lane; and controlling travel of the autonomous vehicle, with the computer system, based on the updated route plan in the fully-autonomous mode.

Clause 33. The method of any of clauses 30-32, wherein the map data is associated with an indication for each lane in the geographic location of a travel direction for the autonomous vehicle in said lane, the method further comprising: for each respective candidate lane of the one or more candidate lanes, determining, with the computer system, that a respective candidate lane is non-viable in response to determining that said respective candidate lane includes: a travel direction that is different by more than a predetermined degree from the starting lane of the autonomous vehicle; and selecting, with the computer system, based on a score, a starting lane from the one or more candidate lanes, by selecting a starting lane from the one or more candidate lanes excluding candidate lanes that are non-viable.

Clause 34. The method of any of clauses 30-33, wherein the score for selecting a starting lane is a weighted sum of: (i) a distance score based on the distance between a position of the autonomous vehicle and a closest point of the candidate lanes driving path, (ii) a heading score based on the difference between a heading of the autonomous vehicle and a heading at the closest point in a driving path of the candidate lane, and (iii) a route score based on the candidate lane including the starting current lane of the autonomous vehicle and/or one of the one or more candidate future lanes in the route of the autonomous vehicle.

Clause 35. The method of any of clauses 30-34, further comprising: controlling the vehicle to transition from a pose estimate of the autonomous vehicle in a coverage lane to a LIDAR pose of the autonomous vehicle in the AV lane.

Clause 36. The method of any of clauses 30-35, further comprising: controlling the vehicle to transition from a current lane in the coverage lane based on a distance from the pose estimate associated with the autonomous vehicle to a future lane in the AV lane.

Clause 37. The method of any of clauses 30-36, further comprising: generating a score for the one or more candidate lanes; and selecting the starting lane of the autonomous vehicle from the one or more candidate lanes based at least in part on the highest score.

Clause 38. The method of any of clauses 30-37, further comprising: determining, with the computer system, one or more future lanes of the autonomous vehicle from the one or more candidate lanes; and generating, with the computer system, the route plan comprising a transition from the selected starting lane to at least one of the one or more future lanes.

Clause 39. A computing system comprising: one or more processors configured to: receive map data associated with a map of a geographic location, the map comprising (i) one or more coverage lanes where the autonomous vehicle can travel under a partially-autonomous mode or a manual mode, and (ii) one or more AV lanes where the autonomous vehicle can travel under a fully-autonomous mode; receive pose data based on a pose estimate associated with a location of the autonomous vehicle in the geographic location; determine one or more candidate lanes within a distance of the pose estimate associated with the autonomous vehicle; select, based on a score, a starting lane from the one or more updated candidate lanes, in response to determining that the updated candidate lanes are not in the route plan; generate a route plan that includes the selected starting lane; and control travel of the autonomous vehicle based on the route plan.

Clause 40. The system of clause 39, wherein the one or more processors are configured to: receive updated pose data based on a LIDAR pose estimate associated with a location of the autonomous vehicle in the geographic location; determine one or more updated candidate lanes within a distance of the LIDAR pose estimate associated with the autonomous vehicle; select, based on a second score, a second starting lane from the one or more candidate lanes; determine, based on the selected second starting lane, that the autonomous vehicle is on the AV lane; generate an updated route plan that includes the second selecting starting lane; and control travel of the autonomous vehicle based on the updated route plan in the fully-autonomous mode.

Clause 41. The system of any of clauses 39-40, wherein the map data is associated with an indication for each lane in the geographic location of a travel direction for the autonomous vehicle in said lane, the one or more processors configured to: determine a candidate lane is non-viable when said candidate lane has a travel direction that is different by more than a predetermined degree from the current lane of the autonomous vehicle; and generate the route plan to exclude each candidate lane that is non-viable.

BRIEF DESCRIPTION OF THE DRAWINGS

FIGS. 7A-7F are diagrams of an implementation of a non-limiting embodiment of a process disclosed herein.

DETAILED DESCRIPTION

Figure 1:
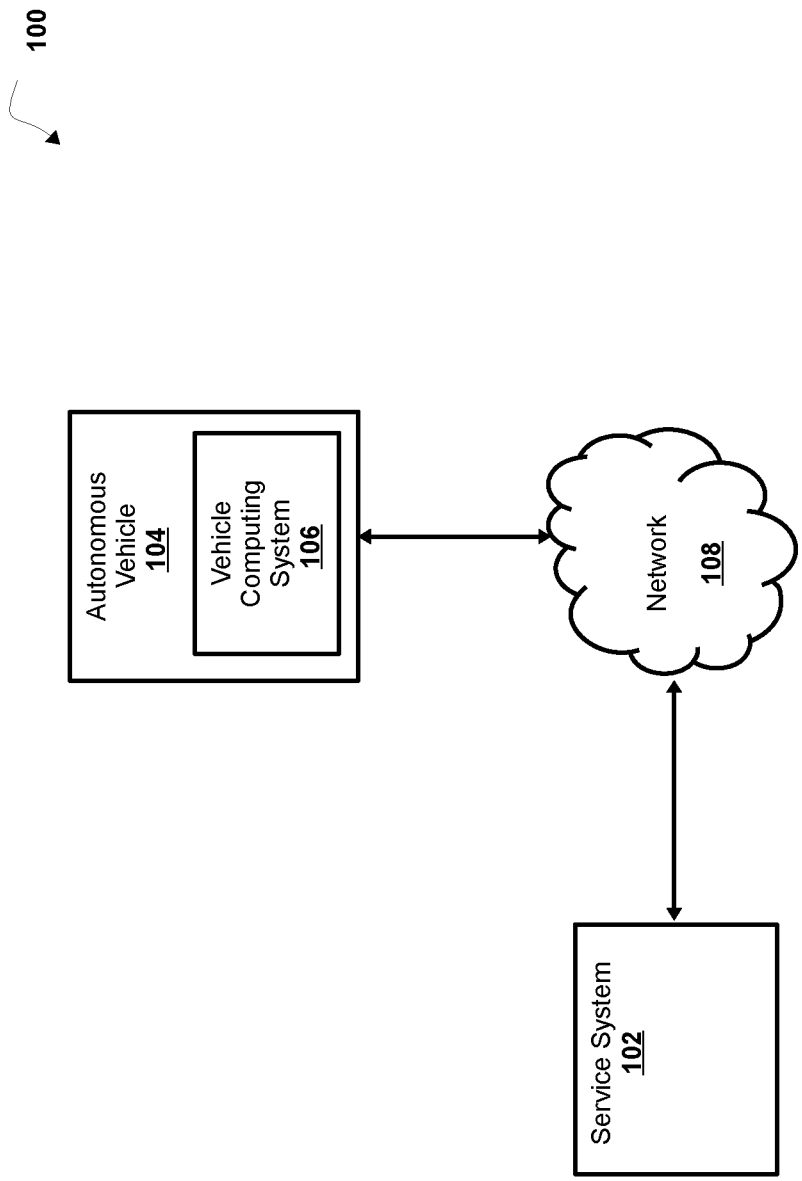
FIG. 1 is a diagram of a non-limiting embodiment of an environment in which systems and/or methods, described herein, can be implemented.

In some non-limiting embodiments, a route plan is generated for a route of an autonomous vehicle from lanes associated with a vehicle pose that an autonomous vehicle may traverse. For example, a route plan associates one or more lanes on one or more roadways in response to receiving a vehicle pose for the autonomous vehicle between an initial location (e.g., trip pick-up location, service pick-up location, current location) and a destination (e.g., destination location, target pose, drop-off location, etc.) based on the map.

However, a route plan may not include lanes on roadways over which an autonomous vehicle can non-autonomously travel (e.g., lanes on roadway segments over which an autonomous vehicle cannot travel autonomously and/or cannot be routed for autonomous travel). As an example, the autonomous vehicle may not be able and/or may not efficiently determine current lanes and future lanes within a route when the vehicle transitions from the AV lanes (e.g., lanes on roadway segments over which an autonomous vehicle can travel fully-autonomously, lanes on roadway segments over which a LIDAR pose estimate is available) and traverses lanes over which the autonomous vehicle cannot travel autonomously (e.g. lanes over which autonomous vehicle operations are unavailable or partially available). For example, when the vehicle exits the AV lanes and enters lanes over which the autonomous vehicle may not travel autonomously, the autonomous vehicle may not be capable of determining a current lane of the autonomous vehicle, determining a route plan to accurately initiate a trip, determining a route plan on future lanes, determining a starting lane for a new route, or determining deviations from a planned route. For example, the autonomous vehicle may not be able to and/or may not efficiently determine a route plan without first determining a current lane from one or more lanes in a roadway when the autonomous vehicle operates on lanes over which the autonomous vehicle cannot travel autonomously (e.g., lanes over which map-based LIDAR pose is not available). Additionally or alternatively, an autonomous vehicle may not be capable of determining a route plan to accurately or efficiently represent a transition from AV lanes to lanes over which an autonomous vehicle can non-autonomously travel, which increases time associated with a localization function when transitioning into AV lanes. Additionally or alternatively, a route plan for an autonomous vehicle may have fewer operating options and/ or roadway options, may experience processing delays associated with satisfying vehicle objectives, and/or may implement additional processing functions to modify or augment a route around non-autonomous lanes. In this way, a route plan for an autonomous vehicle may be less complete and/or result in less efficient processing for services (e.g., trip preview request, trip directive) and applications (e.g., ride scheduling, ride display, turn-by-turn instructions).

As disclosed herein, in some non-limiting embodiments, a vehicle computing system of an autonomous vehicle receives map data associated with a map of a geographic area, the map comprising one or more coverage lanes where the autonomous vehicle can travel under a partially-autonomous mode or a manual mode, and one or more AV lanes where the autonomous vehicle can travel under a fully-autonomous mode and plans a route including an AV lane over and a coverage lane over which the autonomous vehicle can be routed non-autonomously (e.g., routed for non-autonomous travel) based on the map data. In this way, the vehicle computing system determines an accurate and efficient route plan for controlling travel of the autonomous vehicle in lanes on a route with both autonomous operation (e.g., autonomous operation, autonomous travel, and/or routing for autonomous travel based on an AV lane) and non-autonomous operation (e.g., non-autonomous operation, non-autonomous travel, and/or routing for non-autonomous travel based on a coverage lane) of the autonomous vehicle. In some non-limiting embodiments, the vehicle computing system receives vehicle pose data (e.g. vehicle position data) associated with a vehicle pose estimate in a coverage lane (e.g., low quality pose estimate, pose estimate without map-based LIDAR data, pose estimate for autonomous vehicle travel over a coverage lane) associated with a location of the autonomous vehicle in the geographic location. The vehicle computing system determines, based on the pose data, that the autonomous vehicle is on a coverage lane, and in response to determining that the autonomous vehicle is on the coverage lane, determines one or more candidate lanes (e.g. lanes over which the autonomous vehicle may be routed) within a distance of the pose estimate associated with the autonomous vehicle. The vehicle computing system generates at least one route plan based on the one or more candidate lanes and a starting lane of the autonomous vehicle. The vehicle computing system controls travel of the autonomous vehicle based on one of the at least one route plan. Accordingly, the route plan enables the vehicle computing system to generate a route for the autonomous vehicle in a more efficient manner with less processing delays and/or routing for to be performed. In this way, a route plan may be determined on coverage lanes of a roadway, on AV lanes of a roadway, and/or any combination that the vehicle computing system may efficiently determine when generating a route plan in current candidate lanes and future lanes of an autonomous vehicle on a roadway. For example, when the vehicle leaves the AV lanes and enters coverage lanes, the computing system may accurately initiate a trip from a current candidate lane, plan a route on a current candidate lanes and future lanes, or efficiently determine deviations from a lane of a planned route when current candidate lanes are not in the current route plan. In addition, a route plan may accurately and/or efficiently represent a route in coverage lanes and AV lanes and/or a transition between coverage lanes and AV lanes such that an autonomous vehicle may accurately and efficiently determine a route plan over coverage lanes where the autonomous vehicle may travel partially-autonomously or manually and which decreases time associated with a localization function when transitioning into AV lanes. In this way, a route plan may have additional operating options and/or roadway options, may reduce processing delays associated with satisfying vehicle objectives, and/or may not require additional processing functions to modify or augment a route around non-autonomous lanes. Accordingly, a route may be more complete, satisfy routing objectives, and/or result in efficient processing for services (e.g., trip preview request, trip directive) and applications (e.g., ride scheduling, ride display, turn-by-turn instructions).

In some non-limiting embodiments, a map-relative localization of an autonomous vehicle is used for routing and operation of an autonomous vehicle (e.g., controlling navigation systems of an autonomous vehicle) during travel on roadways (e.g., submaps) specified in a map of a geographic location. However, map-relative localization determined without a functionality of the autonomous vehicle associated with the fully-autonomous mode, such as LIDAR localization, may provide invalid data, insufficient specificity and/or an incorrectly determined position of an autonomous vehicle. For example, in locations where only a position based on geospatial coordinates is used, specificity may not be sufficient with respect to the location of the autonomous vehicle. In some cases, geospatial coordinates may not be capable of being efficiently used for determining a map-relative vehicle pose because geospatial coordinates may be disconnected from the map and/or submaps. In some cases, in locations where a vehicle pose based on a functionality of the autonomous vehicle associated with the fully-autonomous mode is unavailable, vehicle navigation and tracking systems may be disrupted and/or route planning unavailable (e.g., planning, re-planning, deviation detection) because of insufficient or invalid position data. In some cases, operator display applications and user display applications used for autonomous vehicle operations and or autonomous vehicle route development may not receive appropriate information for display to operators, developers, and/or users of autonomous vehicles. In this way, an autonomous vehicle may be less complete and/or result in less efficient processing for operating and/or routing when the autonomous vehicle is not capable of determining a vehicle pose based on a functionality of the autonomous vehicle associated with the fully-autonomous mode.

As disclosed herein, a vehicle pose based on geospatial coordinates of an autonomous vehicle (e.g. low quality pose, etc.) may be determined in one or more roadways of a map of a geographic location. For example, a vehicle computing system determines a map-relative vehicle pose based on a vehicle position on a roadway in which the autonomous vehicle cannot operate a fully-autonomous localization mode (e.g., determined based on a functionality of the autonomous vehicle associated with the fully-autonomous mode, such as LIDAR localization). For example, a vehicle computing system may use a vehicle position (e.g., geospatial coordinates, etc.) in roadways in which the autonomous vehicle can travel in or under a partially-autonomous mode or a manual mode (e.g., be routed, operate, and/or travel partially-autonomously or manually (e.g., non-autonomously)). In this way, a vehicle computing system increases coverage of routes by expanding localization (e.g., determination of vehicle pose estimates) in the map to geographic locations where the autonomous vehicle can traverse one or more lanes in or under the partially-autonomous mode or the manual mode (e.g., without the functionality associated with the fully-autonomous mode, such as the LIDAR localization, etc.) while maintaining a more precise map localized vehicle pose and executing service missions (e.g., data collection, trip pickup/drop-off, etc.). In this way, the vehicle computing system increases efficiency for planning and re-planning of routes while traversing roadways of maps in geographic locations where the autonomous vehicle can traverse one or more lanes in or under the partially-autonomous mode or the manual mode and/or for consistency in a geographic location where the autonomous vehicle transitions between a vehicle pose in an autonomous mode and a vehicle pose in a non-autonomous mode. Accordingly, the low quality pose enables the vehicle computing system to generate a route in a more efficient manner with less processing delays and/or routing for the autonomous vehicle to be performed by the vehicle processing system (e.g., completely by the vehicle processing system).

As disclosed herein, in some non-limiting embodiments, a vehicle computing system of an autonomous vehicle obtains map data associated with one or more submaps of the map having geospatial coordinates with a pose at sea level in a geographic location including one or more roadways. In some non-limiting embodiments, a submap is connected to one or more neighbor submaps by a transformation. For example, the map includes a first submap represented by a first local Euclidean space and a second submap represented by a second local Euclidean space. The vehicle computing system determines a route plan (e.g., a route, a map including a route, a route represented as a map, etc.) that includes a first roadway in the first submap and a second roadway in the second submap using a first projection between a global coordinate system and the first local Euclidean space and a second projection between the global coordinate system and the second local Euclidean space. The vehicle computing system controls at least one functionality of the autonomous vehicle (e.g., controls driving of the autonomous vehicle, etc.) on the first roadway and the second roadway based on the route plan. For example, the vehicle computing system can more quickly determine a submap in which the autonomous vehicle is currently located, which reduces a bootstrapping time associated with a localization functionality or system of the autonomous vehicle.

Referring now to FIG. 1, FIG. 1 is a diagram of a non-limiting embodiment of an environment 100 in which systems and/or methods, described herein, can be implemented. As shown in FIG. 1, environment 100 includes service system 102, autonomous vehicle 104 including vehicle computing system 106, and network 108. Systems and/or devices of environment 100 can interconnect via wired connections, wireless connections, or a combination of wired and wireless connections.

In some non-limiting embodiments, service system 102 and/or autonomous vehicle 104 include one or more devices capable of generating, receiving, storing, and/or providing map data (e.g., map data, AV map data, coverage map data, hybrid map data, submap data, etc.) associated with a map (e.g., a map, a submap, an AV map, a coverage map, a hybrid map, etc.) of a geographic location (e.g., a country, a state, a city, a portion of a city, a township, a portion of a township, etc.). In some non-limiting embodiments, map data includes data associated with a roadway (e.g., an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, or the like), or the like. In some non-limiting embodiments, a roadway includes a portion of road on which a vehicle is intended to travel and is not restricted by a physical barrier or by separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example a lane of a roadway is connected to another lane of the roadway and/or a lane of the roadway is connected to a lane of another roadway.

In some non-limiting embodiments, a map of a geographic location includes one or more lanes that may be associated with one or more route plans over one or more roadways. In some non-limiting embodiments, map data associated with a map of the geographic location associates each roadway of the one or more roadways with an indication of whether autonomous vehicle 104 can travel (e.g. be routed) on that roadway. In some non-limiting embodiments, maps are used for localization of autonomous vehicle 104 on a roadway specified in the map. In some non-limiting embodiments, maps are used by autonomous vehicle 104 for determining a route plan while traversing a roadway specified in the map.

In some non-limiting embodiments, autonomous vehicle 104 includes one or more devices capable of receiving map data associated with a map of a geographic location, determining, based on the map data a localization of autonomous vehicle 104. In some non-limiting embodiments, autonomous vehicle 104 may use various data sources (e.g., LIDAR) with an A map to perform map-based localization. In some non-limiting embodiments, autonomous vehicle 104 includes one or more devices capable of determining that autonomous vehicle 104 is in a geographic location without map-based localization (e.g. in a coverage lane), and, in response to determining that the autonomous vehicle 104 is in a location without map-based localization, determining a map-relative pose based on a position of the autonomous vehicle 104 in a geographic location. For example, autonomous vehicle 104 can include one or more computing systems including one or more processors (e.g., one or more servers, etc.) capable of determining a global position of autonomous vehicle 104. Further details regarding non-limiting embodiments of autonomous vehicle 104 are provided below with regard to FIG. 2.

In some non-limiting embodiments, service system 102 includes a service platform for providing services for an application platform, such as a transportation platform, a ride sharing platform, a delivery service platform, a courier service platform, and/or the like. As an example, service system 102 communicates with vehicle computing system 106 to provision maps associated with an application platform, such as a transportation platform, a ride sharing platform, a delivery service platform, a courier service platform, and/or other service platforms. In some non-limiting embodiments, service system 102 is associated with a central operations system and/or an entity associated with autonomous vehicle 104 and/or an application platform such as, for example, an autonomous vehicle owner, autonomous vehicle manager, fleet operator, service provider, etc.

In some non-limiting embodiments, network 108 includes one or more wired and/or wireless networks. For example, network 108 includes a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100. As an example, in some non-limiting embodiments, a computer system is implemented within service system 102 or vehicle computing system 106, or implemented as multiple, distributed systems within and/or across service system 102 and vehicle computing system 106. For example, service system 102 can determine a first route before the user is picked up for a service, and vehicle computing system 106 can determine a second route based on route data after receiving an indication that a user is on board autonomous vehicle 104.

Figure 2:
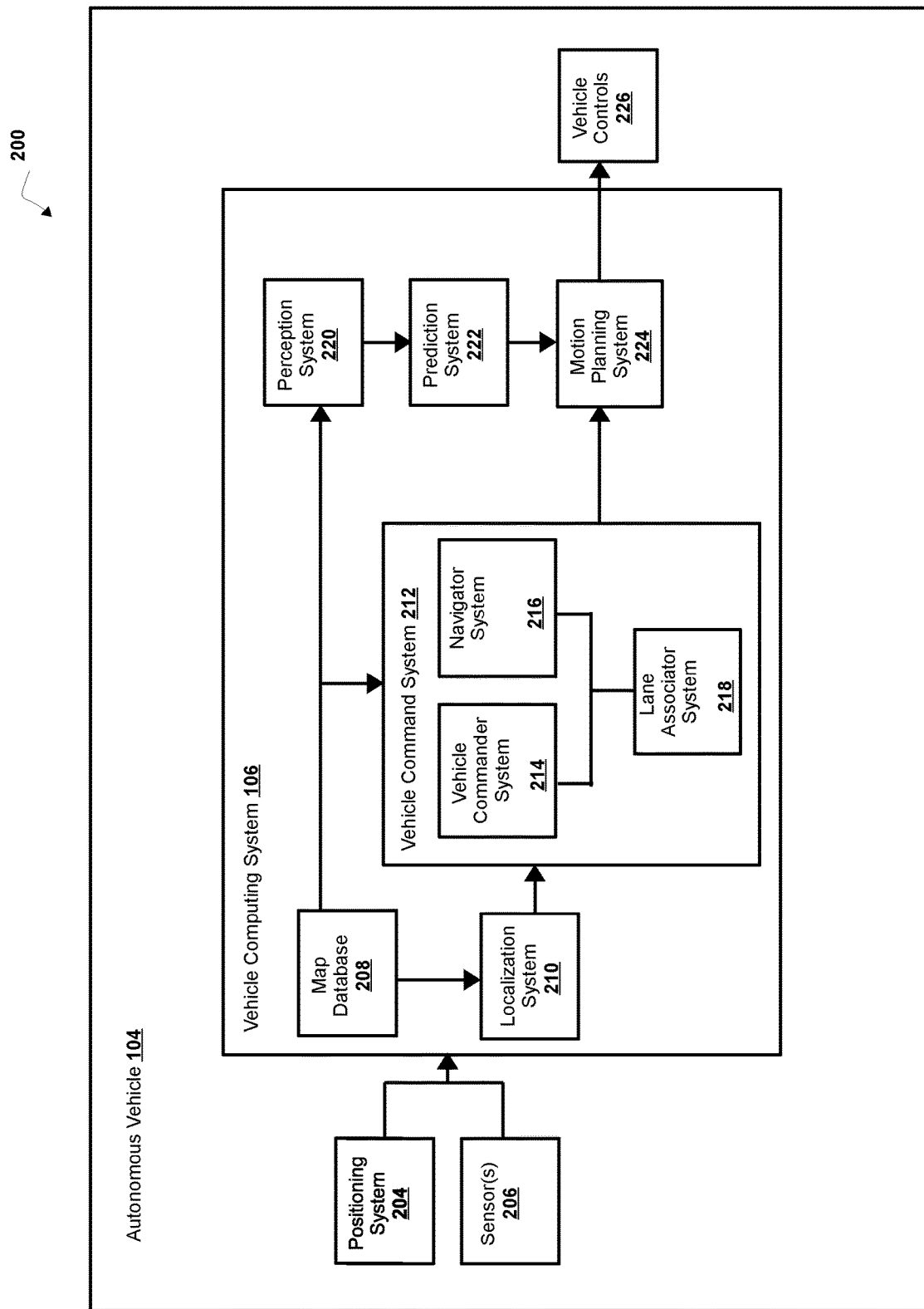
FIG. 2 is a diagram of a non-limiting embodiment of a system for controlling an autonomous vehicle shown in FIG. 1.

Referring now to FIG. 2, FIG. 2 is a diagram of a non-limiting embodiment of a system 200 for controlling autonomous vehicle 104. As shown in FIG. 2, vehicle computing system 106 includes vehicle command system 212, perception system 220, prediction system 222, and motion planning system 224 that cooperate to perceive a surrounding environment of autonomous vehicle 104, determine a motion plan and control the motion (e.g., the direction of travel) of autonomous vehicle 104 accordingly.

In some non-limiting embodiments, vehicle computing system 106 is connected to or includes positioning system 204. In some non-limiting embodiments, positioning system 204 determines a position (e.g., a current position, a past position, etc.) of autonomous vehicle 104. In some non-limiting embodiments, positioning system 204 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments, the position of autonomous vehicle 104 is used by vehicle computing system 106.

In some non-limiting embodiments, vehicle computing system 106 receives sensor data from one or more sensors 206 that are coupled to or otherwise included in autonomous vehicle 104. For example, one or more sensors 206 includes a Light Detection and Ranging (LIDAR) system, a Radio Detection and Ranging (RADAR) system, one or more cameras (e.g., visible spectrum cameras, infrared cameras, etc.), and/or the like. In some non-limiting embodiments, the sensor data includes data that describes a location of objects within the surrounding environment of the autonomous vehicle 104. In some non-limiting embodiments, one or more sensors 206 collect sensor data that includes data that describes a location (e.g., in three-dimensional space relative to the autonomous vehicle 104) of points that correspond to objects within the surrounding environment of autonomous vehicle 104.

In some non-limiting embodiments, the sensor data includes a location (e.g., a location in three-dimensional space relative to the LIDAR system) of a number of points (e.g., a point cloud) that correspond to objects that have reflected a ranging laser. In some non-limiting embodiments, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments, the sensor data includes a location (e.g., a location in three-dimensional space relative to the RADAR system) of a number of points that correspond to objects that have reflected a ranging radio wave. In some non-limiting embodiments, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments, the RADAR system provides information about the location and/or the speed of an object relative to the RADAR system based on the radio waves.

In some non-limiting embodiments, image processing techniques (e.g., range imaging techniques such as, for example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments, map database 208 provides detailed information associated with the map, features of the roadway in the geographic location, and information about the surrounding environment of the autonomous vehicle 104 for the autonomous vehicle to use while driving (e.g. traversing a route, planning a route, determining a motion plan, controlling the autonomous vehicle, etc.).

In some non-limiting embodiments, vehicle computing system 106 receives a vehicle pose from localization system 210 based on one or more sensors 206 that are coupled to or otherwise included in autonomous vehicle 104. In some non-limiting embodiments, the localization system 210 includes a LIDAR localizer, a low quality pose localizer, and/or a pose filter. For example, the localization system uses a pose filter that receives and/or determines one or more valid pose estimates (e.g. not based on invalid position data, etc.) from the LIDAR localizer and/or the low quality pose localizer, for determining a map-relative vehicle pose. For example, low quality pose localizer determines a low quality pose estimate in response to receiving position data from positioning system 204 for operating (e.g., routing, navigating, controlling, etc.) the autonomous vehicle 104 under manual control (e.g. in a coverage lane). In some non-limiting embodiments, LIDAR localizer determines a LIDAR pose estimate in response to receiving sensor data (e.g. LIDAR data, RADAR data, etc.) from sensors 206 for operating (e.g., routing, navigating, controlling, etc.) the autonomous vehicle 104 under autonomous control (e.g. in an AV lane).

In some non-limiting embodiments vehicle command system 212 includes vehicle commander system 214, navigator system 216, and lane associator system 218 that cooperate to route and/or navigate the autonomous vehicle 104 in a geographic location. In some non-limiting embodiments, vehicle commander system 214 provides tracking of a current objective of the autonomous vehicle 104, including a current service, a target pose, and/or a coverage plan (e.g. development testing, etc.). In some non-limiting embodiments, navigator system 216 determines and/or provides a route plan for the autonomous vehicle 104 based on the current state of the autonomous vehicle 104, map data (e.g. lane graph, etc.), and one or more vehicle commands (e.g. a target pose). For example, navigator system 216 determines a route plan (e.g., plan, re-plan, deviation, etc.) including one or more lanes (e.g., current lane, future lane, etc.) in one or more roadways that the autonomous vehicle 104 may traverse on a route to a destination (e.g. target, trip drop-off, etc.).

In some non-limiting embodiments, navigator system 216 determines a route plan based on one or more lanes received from lane associator system 218. In some non-limiting embodiments, lane associator system 218 determines one or more lanes of a route in response to receiving a vehicle pose from the localization system 210. For example, the lane associator system 218 determines, based on the vehicle pose, that the AV is on a coverage lane, and in response to determining that the AV is on the coverage lane, determines one or more candidate lanes (e.g. routable lanes) within a distance of the vehicle pose associated with the autonomous vehicle 104. For example, the lane associator system 218 determines, based on the vehicle pose, that the AV is on an AV lane, and in response to determining that the AV is on the AV lane, determines one or more candidate lanes (e.g. routable lanes) within a distance of the vehicle pose associated with the autonomous vehicle 104. In some non-limiting embodiments, navigator system 216 generates a cost function for each of one or more candidate lanes the autonomous vehicle 104 may traverse on a route to a destination. For example, navigator system 216 generates the cost function that describes a cost (e.g., a cost over a time period) of following (e.g., adhering to) one or more lanes that may be used to reach a target pose.

In some non-limiting embodiments, perception system 220 detects and/or tracks objects (e.g., vehicles, pedestrians, bicycles, and the like) that are proximate to (e.g., in proximity to the surrounding environment of) the autonomous vehicle 104 over a time period. In some non-limiting embodiments, perception system 220 can retrieve (e.g., obtain) map data from map database 208 that provides detailed information about the surrounding environment of the autonomous vehicle 104.

In some non-limiting embodiments, perception system 220 determines one or more objects that are proximate to autonomous vehicle 104 based on sensor data received from one or more sensors 206 and/or map data from map database 208. For example, perception system 220 determines, for the one or more objects that are proximate, state data associated with a state of such object. In some non-limiting embodiments, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments, perception system 220 determines state data for an object over a number of iterations of determining state data. For example, perception system 220 updates the state data for each object of a plurality of objects during each iteration.

In some non-limiting embodiments, prediction system 222 receives the state data associated with one or more objects from perception system 220. Prediction system 222 predicts one or more future locations for the one or more objects based on the state data. For example, prediction system 222 predicts the future location of each object of a plurality of objects within a time period (e.g., 5 seconds, 10 seconds, 20 seconds, etc.). In some non-limiting embodiments, prediction system 222 predicts that an object will adhere to the object's direction of travel according to the speed of the object. In some non-limiting embodiments, prediction system 222 uses machine learning techniques or modeling techniques to make a prediction based on state data associated with an object.

In some non-limiting embodiments, motion planning system 224 determines a motion plan for autonomous vehicle 104 based on a prediction of a location associated with an object provided by prediction system 222 and/or based on state data associated with the object provided by perception system 220. For example, motion planning system 224 determines a motion plan (e.g., an optimized motion plan) for the autonomous vehicle 104 that causes autonomous vehicle 104 to travel relative to the object based on the prediction of the location for the object provided by prediction system 222 and/or the state data associated with the object provided by perception system 220.

In some non-limiting embodiments, Motion Planning system 224 receives a route plan as a command from the navigator system 216. In some non-limiting embodiments, motion planning system 224 determines a cost function for each of one or more motion plans of a route for autonomous vehicle 104 based on the locations and/or predicted locations of one or more objects. For example, motion planning system 224 determines the cost function that describes a cost (e.g., a cost over a time period) of following (e.g., adhering to) a motion plan (e.g., a selected motion plan, an optimized motion plan, etc.). In some non-limiting embodiments, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments, motion planning system 224 determines a cost of following a motion plan. For example, motion planning system 224 determines a motion plan for autonomous vehicle 104 based on one or more cost functions. In some non-limiting embodiments, motion planning system 224 determines a motion plan (e.g., a selected motion plan, an optimized motion plan, a preferred motion plan, etc.) that minimizes a cost function. In some non-limiting embodiments, motion planning system 224 provides a motion plan to vehicle controls 226 (e.g., a device that controls acceleration, a device that controls steering, a device that controls braking, an actuator that controls gas flow, etc.) to implement the motion plan.

Figure 3:
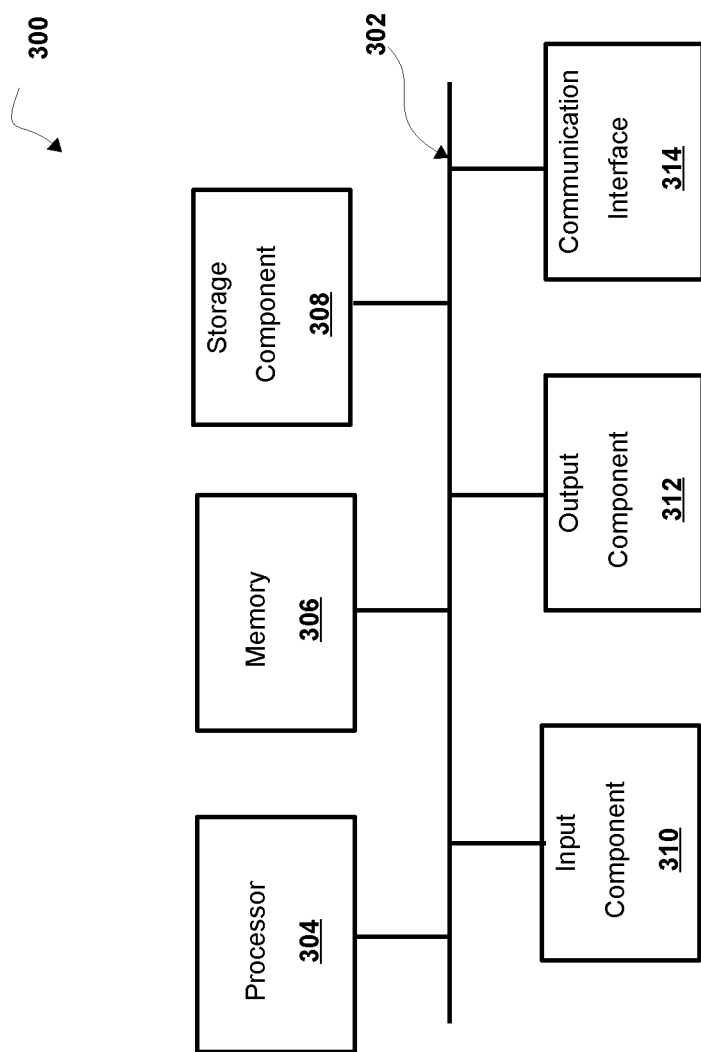
FIG. 3 is a diagram of a non-limiting embodiment of components of one or more devices of FIGS. 1 and 2.

Referring now to FIG. 3, FIG. 3 is a diagram of example components of a device 300. Device 300 can correspond to one or more devices of service system 102 and/or one or more devices (e.g., one or more devices of a system of) autonomous vehicle 104. In some non-limiting embodiments, one or more devices of service system 102 and/or one or more devices (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via the communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
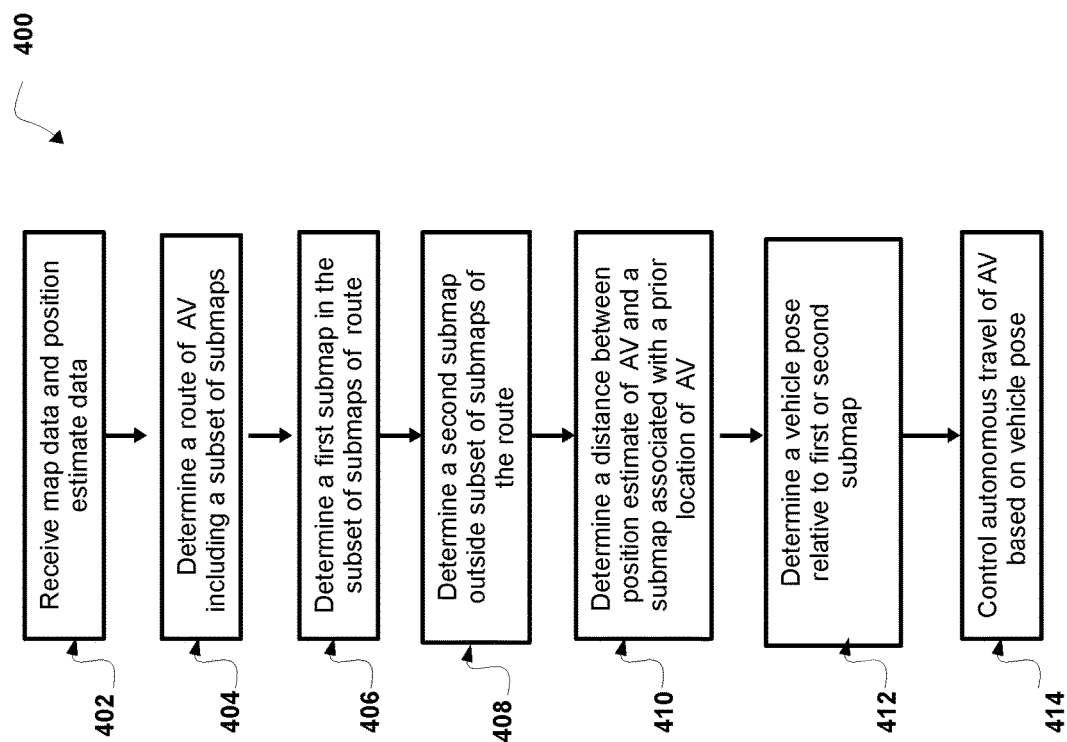
FIG. 4 is a flowchart of a non-limiting embodiment of a process for determining a vehicle pose.

Referring now to FIG. 4, FIG. 4 is a flowchart of a non-limiting embodiment of a process 400 for determining a vehicle pose for controlling an autonomous vehicle 104. In some non-limiting embodiments, one or more of the steps of process 400 are performed (e.g., completely, partially, etc.) by autonomous vehicle 104 (e.g., one or more devices of autonomous vehicle 104). In some non-limiting embodiments, one or more of the steps of process 400 are performed (e.g., completely, partially, etc.) by another device or a group of devices separate from or including autonomous vehicle 104, such as service system 102 (e.g., one or more devices of service system 102).

As shown in FIG. 4, at step 402, process 400 includes receiving map data associated with a map of a geographic location and position estimate data associated with a position estimate of the autonomous vehicle 104 in the geographic location. For example, autonomous vehicle 104 (e.g., vehicle computing system 106, etc.) receives map data associated with a map of a geographic location from service system 102 and/or a database (e.g., a database associated with service system 102, a database located in service system 102, a database remote from service system 102, a database associated with autonomous vehicle 104, a database located in autonomous vehicle 104 (e.g., map database 208, etc.), a database remote from autonomous vehicle 104, etc.). In some non-limiting embodiments, the map includes (i) the coverage lane where the autonomous vehicle 104 can operate and/or travel under a partially-autonomous mode or a manual mode, and (ii) an autonomous vehicle 104 lane where the autonomous vehicle 104 can operate and/or travel under the fully-autonomous mode, and the coverage lane is linked to the AV lane.

In some non-limiting embodiments, map data includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. In some non-limiting embodiments, a map of a geographic location includes one or more routes that include one or more roadways.

In some non-limiting embodiments, a road refers to a paved or otherwise improved path between two places that allows for travel by a vehicle (e.g., autonomous vehicle 104). Additionally, or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally, or alternatively, a roadway (e.g., one or more roadway segments) includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example a lane of a roadway is connected to another lane of the roadway and/or a lane of the roadway is connected to a lane of another roadway.

In some non-limiting embodiments, a roadway is associated with map data (e.g., map data, AV map data, coverage map data, hybrid map data, submap data, etc.) that defines one or more roadway segments or extents of the roadway. For example, a roadway segment or extent can be connected or linked to another roadway segment or extent to form a roadway network, or a roadway network can be divided into roadways segments or extents. In some non-limiting embodiments, a roadway segment or extent is associated with one or more lanes (e.g., one or more AV lanes, one or more coverage lanes, one or more hybrid lanes, etc.), and the one or more lanes are associated with a directional indicator indicating a direction of travel in the one or more lanes of the roadway segment or extent.

In some non-limiting embodiments, a roadway is associated with map data (e.g., map data, AV map data, coverage map data, hybrid map data, submap data, etc.) that defines one or more attributes of (e.g., metadata associated with) the roadway (e.g., attributes of a roadway in a geographic location, attributes of a segment or extent of a roadway, attributes of a lane of a roadway, etc.). In some non-limiting embodiments, an attribute (e.g., feature) of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like. In some non-limiting embodiments, an attribute of a roadway includes one or more features of the roadway associated with one or more traversals of the roadway by one or more autonomous vehicles 104, a number of traversals of the roadway by one or more autonomous vehicles 104, a number of interventions associated with one or more traversals of the roadway by one or more autonomous vehicles 104, a number of objects (e.g., a number of hazards, a number of bicycles, a railway track in proximity to the roadway, etc.) associated with one or more traversals of the roadway by one or more autonomous vehicles 104, a distance (e.g., an average distance, a mile, etc.) associated with one or more traversals of the roadway by one or more autonomous vehicles 104 (e.g., a distance until a detection of a hazardous event, a distance until detection of a potentially harmful or a harmful event to an autonomous vehicle 104, to a rider of the autonomous vehicle 104, to a pedestrian, a distance between a first detection of a hazardous event and a second detection of a hazardous event, miles per harmful event, etc.), one or more traffic controls of the roadway associated with one or more traversals of the roadway by one or more autonomous vehicles 104, one or more aspects of the roadway (e.g., a dimension of one or more lanes of the roadway, a width of one or more lanes of the roadway, a number of bicycle lanes of the roadway, etc.) associated with one or more traversals of the roadway by one or more autonomous vehicles 104, a speed of one or more autonomous vehicles 104 associated with one or more traversals of the roadway by the one or more autonomous vehicles 104, and/or the like.

In some non-limiting embodiments, a lane of a roadway (and/or a roadway segment or extent) includes one or more ends. For example, an end of a lane (and/or an end of a roadway segment or extent) is associated with or corresponds to a geographic location at which map data associated with the lane (and/or the roadway segment or extent) is unavailable. As an example, an end of an AV lane can correspond to a geographic location at which map data for that lane ends (e.g., a geographic location at which map data associated with the AV lane of a roadway segment extent transitions from AV map data to coverage map data associated with a coverage lane of the roadway segment, to less detailed AV map data, to no AV map data, to no map data, etc.).

In some non-limiting embodiments, the map data includes a link (e.g., a logical link) that connects or links a lane (and/or a roadway segment or extent) to another lane (and/or to another roadway segment or extent). As an example, the map data includes a unique identifier for each lane (and/or roadway segment or extent), and the unique identifiers are associated with one another in the map data to indicate a connection or link of a lane to another lane (or a connection or link of a roadway segment or extent to another roadway segment or extent). For example, the unique identifiers can be associated with one another in the map data to indicate that a lane (and/or a roadway segment or extent) is a predecessor lane or a successor lane to another lane (and/or a predecessor or successor roadway segment or extent to another roadway segment or extent). As an example, a direction of travel of a predecessor lane to another lane is from the predecessor lane to the another lane, and a direction of travel of a successor lane to another lane is from the another lane to the successor lane.

In some non-limiting embodiments, AV map data is associated with an AV lane of a roadway in the geographic location, and the coverage map data is associated with a coverage lane of the roadway in the geographic location. In some non-limiting embodiments, the AV map data is associated with an indication that the autonomous vehicle 104 can operate in the AV lane under a fully-autonomous mode, and the coverage map data is associated with an indication that the autonomous vehicle can operate in the coverage lane under a partially-autonomous mode or a manual mode. For example, an AV lane is associated with an indication that autonomous vehicle 104 can be operated, routed, and/or travel in or under a fully-autonomous mode in the AV lane (e.g., an indication that autonomous vehicle 104 can be routed to travel fully-autonomously and/or travel fully-autonomously in the AV lane), and a coverage lane is associated with an indication that autonomous vehicle 104 can be operated, routed, and/or travel in or under a partially-autonomous mode or a manual mode (e.g., an indication that autonomous vehicle 104 can be routed to travel partially-autonomously or manually and/or travel partially-autonomously or manually in the coverage lane, but cannot be routed to travel fully-autonomously and/or travel fully-autonomously in the coverage lane).

In some non-limiting embodiments, a map includes at least one of the following: an AV lane linked to another AV lane, an AV lane linked to a coverage lane, a coverage lane linked to another coverage lane, a hybrid lane (e.g., a coverage lane) linked between an AV lane and a coverage lane, and/or the like. In some non-limiting embodiments, a hybrid lane is associated with an indication that the autonomous vehicle can operate and/or travel in the hybrid lane under the partially-autonomous mode or the manual mode, but not in the fully-autonomous mode. For example, a hybrid lane (e.g., coverage lane) can be associated with coverage map data and may be represented as a coverage lane for operating, routing, and/or traveling functions of autonomous vehicle 104.

In some non-limiting embodiments, a map includes one or more AV lanes linked to one or more coverage lanes of one or more roadways in a geographic location. For example, a map includes one or more AV maps or submaps including one or more AV lanes linked to one or more coverage maps or submaps including one or more coverage lanes. In some non-limiting embodiments, an arbitrary number of coverage lanes is represented by a single coverage lane in a map. For example, as discussed herein, a coverage lane may not include as high of a level of detail as an AV lane (e.g., a coverage lane may not be associated with map data defining as high a level of detail of attributes as an AV lane).

In some non-limiting embodiments, map data includes LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of a map.

In some non-limiting embodiments, a lane in which autonomous vehicle 104 can operate under the fully-autonomous mode (e.g., an AV lane) is associated with additional and/or alternative map data (e.g., additional or alternative attributes and/or roadway features) than another lane (e.g., a coverage lane or a hybrid lane) in which autonomous vehicle 104 cannot operate under the fully-autonomous mode. As an example, an AV lane in which autonomous vehicle 104 can operate under the fully-autonomous mode can be associated with map data including a more detailed and/or higher resolution map (e.g., a higher resolution point cloud), and a coverage lane in which autonomous vehicle 104 cannot operate under the fully-autonomous mode can be associated with coverage map data including a less detailed and/or lower resolution map (e.g., a lower resolution point cloud or no point cloud).

In some non-limiting embodiments, autonomous vehicle 104 receives map data associated with a map of a geographic location, the map comprising a plurality of submaps where an autonomous vehicle can travel, the plurality of submaps comprising one or more roadways. For example, autonomous vehicle 104 receives a submap that includes a coordinate system with a pose that has an origin at a point of a global coordinate system (e.g., a latitude and longitude point at sea level, etc.). For example, the autonomous vehicle 104 receives map data associated with a map including a first submap represented by a first local Euclidean space and a second submap represented by a second local Euclidean space.

In some non-limiting embodiments, autonomous vehicle 104 includes positioning system 204. In some non-limiting embodiments, positioning system 204 receives a position estimate (e.g., a current position estimate, a past position estimate, etc.) of autonomous vehicle 104. For example, autonomous vehicle 104 receives position data (e.g., latitude, longitude, altitude, coordinated time coordinates, etc.) associated with a position estimate based on sensing information (e.g., a global positioning system (GPS) component, an accelerometer, a gyroscope, an actuator, etc.). In some non-limiting embodiments, positioning system 204 determines a position estimate of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. The position estimate data includes at least one of latitude, longitude and altitude coordinates, and coordinated time coordinates.

In some non-limiting embodiments, positioning system 204 determines a LIDAR pose based on map data that includes LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of a map.

As further shown in FIG. 4, at step 404, process 400 includes determining a route of the autonomous vehicle 104 including a subset of submaps in the plurality of submaps. For example, autonomous vehicle 104 (e.g., vehicle computing system 106, etc.) determines, based on route data associated with a route, a subset of submaps that are included in a route. For example, autonomous vehicle 104 receives route data associated with a route (e.g., one or more roadways, one or more submaps) upon which the autonomous vehicle 104 travels. For example, autonomous vehicle 104 travels on the route based on the map that includes designations (e.g., the location and/or direction of a lane in a submap, the location and/or direction of a lane in a roadway, a parking lane, a turning lane, a bicycle lane, etc.), regarding an operation of the autonomous vehicle 104 when the autonomous vehicle 104 travels on a roadway of the route. In some non-limiting embodiments, vehicle computing system 106 may read route data into memory 306 and/or storage component 308 from another computer-readable medium or from another device via communication interface 314 while traversing a route. For example, vehicle computing system 106 may store (e.g., in memory 306 and/or storage component 308) route data associated with a route (e.g., one or more roadways, one or more submaps) upon which the autonomous vehicle travels.

In some non-limiting embodiments, a route includes at least one roadway connected with another roadway in a plurality of roadways. In some non-limiting embodiments, the service system 102 provides route data associated with the route to an autonomous vehicle 104 for controlling travel of the autonomous vehicle 104 on the route. In some non-limiting embodiments, the autonomous vehicle 104 receives a route generated based on data associated with one or more traversals of one or more roadways of the route by one or more autonomous vehicles. In this way, the autonomous vehicle 104 may be operated efficiently and/or in an effective manner. In some non-limiting embodiments, the service system 102 provides route data associated with a set of predetermined roadways for a route to an autonomous vehicle for controlling travel of the autonomous vehicle on the predetermined roadways of the route.

In some non-limiting embodiments, a service system 102 receives trip data associated with one or more traversals of one or more roadways in a geographic location by one or more autonomous vehicles 104. The service system 102 generates at least one route based on the trip data associated with one or more traversals of one or more roadways by the one or more autonomous vehicles 104. For example, a route may be determined to satisfy current capabilities of the autonomous vehicle 104 fleet. As another example, a route may be selected to optimize certain service parameters (e.g., maximize trip counts, minimize potential interventions, etc.) In this way, the service system 102 generates a route based on data associated with one or more traversals of one or more roadways by one or more autonomous vehicles 104. Accordingly, the service system 102 enables the autonomous vehicle 104 to be operated in a more efficient and/or effective manner on a route than when the autonomous vehicle 104 is operated on a route that is not generated based on trip data associated with one or more traversals of one or more roadways by one or more autonomous vehicles 104.

As further shown in FIG. 4, at step 406, process 400 includes determining a first submap in the subset of submaps of the route closest to the position estimate of the autonomous vehicle 104. For example, autonomous vehicle 104 (e.g., vehicle computing system 106, etc.) determines a first submap included in the subset of submaps. In some non-limiting embodiments, autonomous vehicle 104 determines a first submap in the subset of submaps, For example, the subset of submaps are included in a route based on the map of the geographic location. For example, the vehicle computing system 106 of the autonomous vehicle 104 determines a first submap of the subset of submaps based on a traversal of a plurality of submaps of the autonomous vehicle 104 on a route between a pick-up location and a destination location. As an example, the vehicle computing system 106 determines the first submap including one or more roadways that include a set of lanes previously traversed by the autonomous vehicle 104 from the pick-up location to the destination location. For example, the vehicle computing system 106 determines the first submap in the subset of submaps based on a previous traversal of a portion of the current route by the autonomous vehicle 104 while traversing the current route.

In some non-limiting embodiments, vehicle computing system 106 determines the first submap in the subset of submaps of the route closest to the position estimate of the autonomous vehicle 104 based on a location within a threshold of the vehicle pose estimate. In some non-limiting embodiments, vehicle computing system 106 determines the first submap that includes a coordinate system with a pose that has an origin at a point of a global coordinate system (e.g., a latitude and longitude point at sea level, etc.). For example, the vehicle computing system 106 determines the first submap within a threshold based on a distance between the position estimate of the autonomous vehicle 104 and a submap in the subset of submaps, a centroid of a submap associated with the position estimate of the autonomous vehicle 104, and/or the like. In an example, the vehicle computing system 106 determines the first submap within a threshold based on the local Euclidean space of the first submap.

As further shown in FIG. 4, at step 408, process 400 includes determining a second submap outside the subset of submaps of the route closest to the position estimate of the autonomous vehicle 104. For example, autonomous vehicle 104 (e.g., vehicle computing system 106, etc.) determines a second submap, based on route data, not included in the subset of submaps of a route previously traversed by the autonomous vehicle 104. For example, autonomous vehicle 104 (e.g., vehicle computing system 106, etc.) determines a submap outside the subset of submaps (e.g., not included in the subset of submaps, not included in the route) that was previously traversed by the autonomous vehicle 104. For example, autonomous vehicle 104 determines the submap outside the subset of submaps, the subset of submaps included in a route based on the map of the geographic location. In an example, the vehicle computing system 106 of the autonomous vehicle 104 determines the submap outside of the subset of submaps based on one or more lanes of the subset of submaps not in a portion of the current route previously traversed by the autonomous vehicle 104 while traversing the current route. In another example, the vehicle computing system 106 determines the submap including one or more lanes in a roadway of the submap outside the subset of submaps.

In some non-limiting embodiments, vehicle computing system 106 determines a second submap outside the subset of submaps of the route closest to the position estimate of the autonomous vehicle 104. For example, vehicle computing system 106 determines the submap that includes a coordinate system with a pose that has an origin at a point of a global coordinate system (e.g., a latitude and longitude point at sea level, etc.). For example, the vehicle computing system 106 determines the second submap within a threshold (e.g., a distance between the position estimate of the autonomous vehicle 104 and a submap in the subset of submaps, a centroid of a submap associated with the position estimate of the autonomous vehicle 104, etc.). In some cases, the vehicle computing system 106 determines the second submap outside a threshold, as an example, outside a threshold based on the local Euclidean space of the second submap.

As further shown in FIG. 4, at step 410, process 400 includes determining a distance between a position estimate of the autonomous vehicle 104 and a submap associated with a prior location of autonomous vehicle 104. For example, autonomous vehicle 104 (e.g., vehicle computing system 106, etc.) determines, based on route data and/or map data, a distance between a submap included in a route previously traversed and a position estimate associated with the location of autonomous vehicle 104. In some non-limiting embodiments, vehicle computing system 106 may receive route data from memory 306 and/or storage component 308 from another computer-readable medium or from another device via communication interface 314 while traversing a route. For example, vehicle computing system 106 may read route data from storage (e.g., in memory 306 and/or storage component 308) associated with a route (e.g., one or more roadways, one or more submaps) upon which the autonomous vehicle travels. For example, the vehicle computing system 106 determines a distance of the submap associated with a prior vehicle pose of autonomous vehicle 104 from the position estimate of the autonomous vehicle 104 (e.g., a distance between the position estimate of the autonomous vehicle 104 and a submap associated with a prior location of autonomous vehicle 104, a centroid of a submap associated with the position estimate of the autonomous vehicle 104, etc.). In some cases, the vehicle computing system 106 determines a distance between the position estimate of the autonomous vehicle 104 and a submap associated with a prior location of the autonomous vehicle 104 based on the local Euclidean space of the submap associated with the prior location of autonomous vehicle 104. In some non-limiting embodiments, the vehicle computing system 106 determines the submap based on a number of transitions (e.g., submaps, lanes, roadways, etc.) between the position estimate of the autonomous vehicle 104 and a submap associated with a prior location of autonomous vehicle 104.

In some non-limiting embodiments, the vehicle computing system 106 determines orientation information based on map data associated with one or more transitions between a submap associated with the prior pose of the autonomous vehicle 104 and a submap of the vehicle pose of the autonomous vehicle 104. For example, the vehicle computing system 106 determines orientation information associated with an indication of a travel direction for the autonomous vehicle 104 in the submap. In another example, the vehicle computing system 106 determines the vehicle pose is non-viable when a submap of the vehicle pose has a travel direction that is different than a prior travel direction of the autonomous vehicle 104.

As further shown in FIG. 4, at step 412, process 400 includes determining a vehicle pose relative to the first submap or the second submap based on the distance. For example, autonomous vehicle 104 (e.g., vehicle computing system 106, etc.) determines that the first submap satisfies a threshold based on the distance between the position estimate of the autonomous vehicle 104 and the submap associated with the prior pose. In some non-limiting embodiments, vehicle computing system 106 determines a distance based on a projection point associated with the first submap and a projection point associated with the second submap. In some non-limiting embodiments, the vehicle computing system 106 determines a distance between a first roadway in the first submap and a second roadway in the second submap using a first projection between a global coordinate system and the first local Euclidean space. In some non-limiting embodiments, when determining a pose of the autonomous vehicle 104 in a submap, the vehicle computing system 106 determines a roadway segment including the vehicle pose in the submap based on the map data where the autonomous vehicle 104 can travel under a non-autonomous mode.

In some non-limiting embodiments, vehicle computing system 106 determines that the first submap outside a threshold (e.g., does not satisfy) based on the distance between the position estimate of the autonomous vehicle 104 and the submap associated with the prior vehicle pose. For example, the distance between the position estimate of the autonomous vehicle 104 and the submap associated with the prior pose is outside a threshold. For example, the distance between the position estimate of the autonomous vehicle 104 and the submap associated with the prior pose does not include the first submap.

In some non-limiting embodiments, in response to determining the first submap does not satisfy the threshold, the vehicle computing system 106 determines a projection point associated with the second submap. For example, vehicle computing system 106 determines a vehicle pose in the second submap based on the position estimate data and the projection point.

As further shown in FIG. 4, at step 414, process 400 includes controlling autonomous travel of the autonomous vehicle 104 based on the vehicle pose. For example, vehicle computing system 106 controls autonomous vehicle 104, based on the vehicle pose. For example, vehicle computing system 106 controls autonomous vehicle 104 based on route data provided by service system 102 associated with a route. For example, service system 102 provides (e.g., transmits) route data associated with the route to autonomous vehicle 104. In some non-limiting embodiments, vehicle computing system 106 controls travel of autonomous vehicle 104 based on the route. For example, vehicle controls 226 controls autonomous vehicle 104 based on route data associated with the route. In some non-limiting embodiments. As an example, vehicle computing system 106 controls at least one functionality of autonomous vehicle 104 in the route based on the vehicle pose. As an example, vehicle computing system 106 can generate a route plan based on a transition between a first submap and a second submap and control the at least one functionality of autonomous vehicle 104 based on the vehicle pose.

In some non-limiting embodiments, vehicle computing system 106 controls driving of autonomous vehicle 104 on a first roadway and a second roadway based on the vehicle pose. For example, vehicle computing system 106 controls one or more vehicle controls 226 (e.g., a device that controls acceleration, a device that controls steering, a device that controls braking, an actuator that controls gas flow, etc.) of autonomous vehicle 104 based on the local point, positioning data, sensor data, and/or map data to control travel of autonomous vehicle 104 on the first roadway and the second roadway on the route.

In some non-limiting embodiments, vehicle computing system 106 controls autonomous vehicle 104 to perform the at least one autonomous functionality based on the vehicle pose satisfying at least one threshold (e.g., a local distance to another point, an estimated travel time to another point, etc.). For example, if the vehicle pose is associated with a current position or a destination point of autonomous vehicle 104, vehicle computing system 106 can compare the current position or the destination point with respect to another position (e.g., the other of the current position or the destination point), and control autonomous vehicle 104 to perform the at least one functionality with respect to the local point satisfying the threshold position. As an example, vehicle computing system 106 can delay maintenance or execution of the at least one functionality (e.g., high resolution LIDAR-based localization, etc.) with respect to another submap until autonomous vehicle 104 is within the threshold distance and/or within the threshold travel time of the another submap, which enables reducing processing and/or system load.

Figure 5:
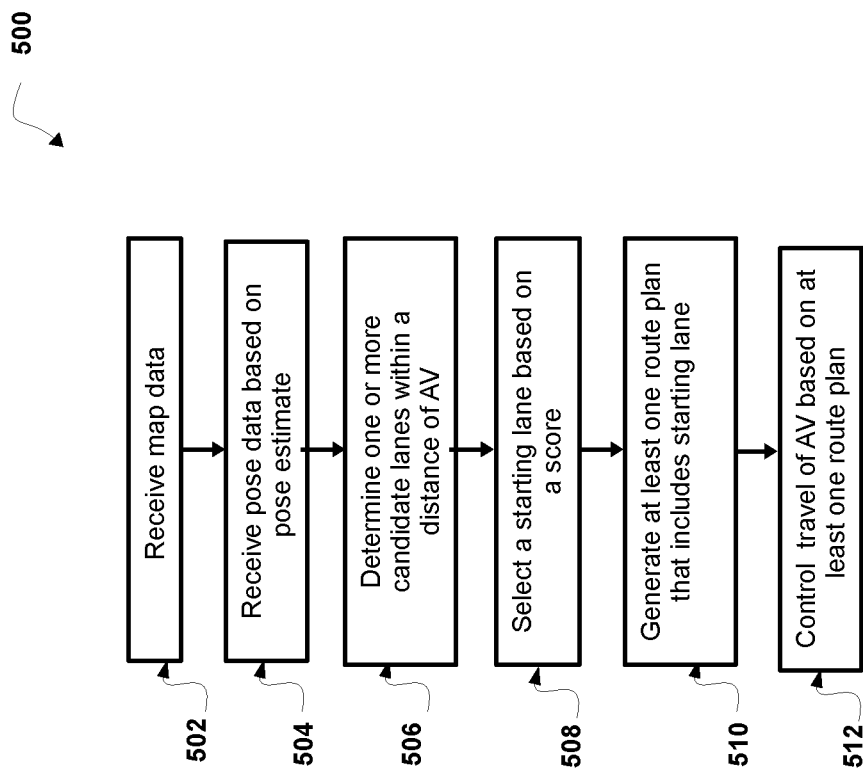
FIG. 5 is a flowchart of a non-limiting embodiment of a process for determining a route plan.

Referring now to FIG. 5, FIG. 5 is a flowchart of a non-limiting embodiment of a process 500 for controlling an autonomous vehicle 104. In some non-limiting embodiments, one or more of the steps of process 500 are performed (e.g., completely, partially, etc.) by autonomous vehicle 104 (e.g., one or more devices of autonomous vehicle 104). In some non-limiting embodiments, one or more of the steps of process 500 are performed (e.g., completely, partially, etc.) by another device or a group of devices separate from or including autonomous vehicle 104, such as, service system 102 (e.g., one or more devices of service system 102).

As shown in FIG. 5, at step 502, process 500 includes receiving map data associated with a map of a geographic location. For example, autonomous vehicle 104 (e.g., vehicle computing system 106, etc.) receives map data associated with a map of a geographic location from service system 102 and/or a database (e.g., a database associated with service system 102, a database located in service system 102, a database remote from service system 102, a database associated with autonomous vehicle 104, a database located in autonomous vehicle 104 (e.g., map database 208, etc.), a database remote from autonomous vehicle 104, etc.). In some non-limiting embodiments, the map includes (i) the coverage lane where the autonomous vehicle 104 can operate and/or travel under a partially-autonomous mode or a manual mode, and (ii) an AV lane where the autonomous vehicle 104 can operate and/or travel under the fully-autonomous mode, and the coverage lane is linked to the AV lane.

In some non-limiting embodiments, map data includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. In some non-limiting embodiments, a map of a geographic location includes one or more routes that include one or more roadways.

In some non-limiting embodiments, a road refers to a paved or otherwise improved path between two places that allows for travel by a vehicle (e.g., autonomous vehicle 104). Additionally, or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally, or alternatively, a roadway (e.g., one or more roadway segments) includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example a lane of a roadway is connected to another lane of the roadway and/or a lane of the roadway is connected to a lane of another roadway.

In some non-limiting embodiments, a roadway is associated with map data (e.g., map data, AV map data, coverage map data, hybrid map data, submap data, etc.) that defines one or more roadway segments or extents of the roadway. For example, a roadway segment or extent can be connected or linked to another roadway segment or extent to form a roadway network, or a roadway network can be divided into roadways segments or extents. In some non-limiting embodiments, a roadway segment or extent is associated with one or more lanes (e.g., one or more AV lanes, one or more coverage lanes, one or more hybrid lanes, etc.), and the one or more lanes are associated with a directional indicator indicating a direction of travel in the one or more lanes of the roadway segment or extent.

In some non-limiting embodiments, AV map data is associated with an AV lane of a roadway in the geographic location, and the coverage map data is associated with a coverage lane of the roadway in the geographic location. In some non-limiting embodiments, the AV map data is associated with an indication that the autonomous vehicle 104 can operate in the AV lane under a fully-autonomous mode, and the coverage map data is associated with an indication that the autonomous vehicle 104 can operate in the coverage lane under a partially-autonomous mode or a manual mode. For example, an AV lane is associated with an indication that autonomous vehicle 104 can be operated, routed, and/or travel in or under a fully-autonomous mode in the AV lane (e.g., an indication that autonomous vehicle 104 can be routed to travel fully-autonomously and/or travel fully-autonomously in the AV lane), and a coverage lane is associated with an indication that autonomous vehicle 104 can be operated, routed, and/or travel in or under a partially-autonomous mode or a manual mode (e.g., an indication that autonomous vehicle 104 can be routed to travel partially-autonomously or manually and/or travel partially-autonomously or manually in the coverage lane, but cannot be routed to travel fully-autonomously and/or travel fully-autonomously in the coverage lane).

In some non-limiting embodiments, a map includes at least one of the following: an AV lane linked to another AV lane, an AV lane linked to a coverage lane, a coverage lane linked to another coverage lane, a hybrid lane linked between an AV lane and a coverage lane, and/or the like. In some non-limiting embodiments, a hybrid lane is associated with an indication that the autonomous vehicle 104 can operate and/or travel in the hybrid lane under the partially-autonomous mode or the manual mode, but not in the fully-autonomous mode. For example, a hybrid lane can be associated with coverage map data and may be represented as a coverage lane for operating, routing, and/or traveling functions of autonomous vehicle 104.

In some non-limiting embodiments, a map includes one or more AV lanes linked to one or more coverage lanes of one or more roadways in a geographic location. For example, a map includes one or more AV maps or submaps including one or more AV lanes linked to one or more coverage maps or submaps including one or more coverage lanes. In some non-limiting embodiments, an arbitrary number of coverage lanes is represented by a single coverage lane in a map. For example, as discussed herein, a coverage lane may not include as high of a level of detail as an AV lane (e.g., a coverage lane may not be associated with map data defining as high a level of detail of attributes as an AV lane).

In some non-limiting embodiments, map data includes LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of a map.

In some non-limiting embodiments, a lane in which autonomous vehicle 104 can operate under the fully-autonomous mode (e.g., an AV lane) is associated with additional and/or alternative map data (e.g., additional or alternative attributes and/or roadway features) than another lane (e.g., a coverage lane or a hybrid lane) in which autonomous vehicle 104 cannot operate under the fully-autonomous mode. As an example, an AV lane in which autonomous vehicle 104 can operate under the fully-autonomous mode can be associated with map data including a more detailed and/or higher resolution map (e.g., a higher resolution point cloud), and a coverage lane in which autonomous vehicle 104 cannot operate under the fully-autonomous mode can be associated with coverage map data including a less detailed and/or lower resolution map (e.g., a lower resolution point cloud or no point cloud).

As further shown in FIG. 5, at step 504, process 500 includes receiving pose data based on a vehicle pose estimate associated with a location of the autonomous vehicle 104 in the geographic area. For example, autonomous vehicle 104 includes positioning system 204 that determines positioning data associated with a position of autonomous vehicle 104. In some non-limiting embodiments, autonomous vehicle 104 includes positioning system 204. In some non-limiting embodiments, positioning system 204 determines a position estimate (e.g., a current position estimate, a past position estimate, etc.) of autonomous vehicle 104. For example, autonomous vehicle 104 determines a position estimate based on sensing information (e.g., a global positioning system (GPS) component, an accelerometer, a gyroscope, an actuator, etc.). In some non-limiting embodiments, positioning system 204 determines a position estimate of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments, positioning system 204 determines a vehicle pose as in the process previously described with reference to FIG. 4 based on the position estimate. For example, positioning system 204 determines a vehicle pose based on a position estimate of a GPS system.

For example, vehicle computing system 106 determines a vehicle pose estimate based on position data of the positioning system 204 as in the process previously described with reference to FIG. 4 based on the position estimate.

In some non-limiting embodiments, autonomous vehicle 104 includes determining, based on the map data a LIDAR pose estimate of autonomous vehicle 104. For example, autonomous vehicle 104 may use various data sources (e.g., LIDAR) with an AV map to determine a LIDAR pose estimate of the autonomous vehicle 104. In some non-limiting embodiments, autonomous vehicle 104 determines a LIDAR pose estimate, in response to determining that the autonomous vehicle is in an AV lane, of the autonomous vehicle 104 in a geographic location.

As further shown in FIG. 5, at step 506, process 500 includes determining one or more candidate lanes within a distance of the pose estimate associated with the autonomous vehicle 104. For example, autonomous vehicle 104 (e.g., vehicle computing system 106, etc.) determines one or more candidate lanes over which an autonomous vehicle can be routed within a distance (e.g., radius, number of transition, distance of a centroid) of the vehicle pose (e.g., low quality vehicle pose) in the current submap. (e.g., a submap associated with the determined position of the vehicle). In some non-limiting embodiments, the vehicle computing system 106 determines one or more candidate lanes by searching for candidate lanes within a threshold distance of the vehicle pose estimate. For example, the vehicle computing system 106 determines candidate lanes by searching for lanes in the map data within a threshold distance of a vehicle pose in the map associated with the current vehicle pose estimate in the geographic location.

In some non-limiting embodiments, the vehicle computing system 106, when determining one or more candidate lanes within a distance of the pose estimate associated with the autonomous vehicle 104, includes a search for lanes in a submap associated with the current vehicle pose of the autonomous vehicle 104. For example, vehicle computing system 106, determines candidate lanes based on a search for lanes in the neighborhood (e.g., radius of the autonomous vehicle 104, radius of submap, radius of current lane, radius of vehicle pose estimate) of a submap associated with the current vehicle pose of the autonomous vehicle 104. For example, vehicle computing system 106 determines one or more candidate lanes based on a distance between a position of the autonomous vehicle and a closest point (e.g., latitude and longitude coordinate, etc.) of the lane. In some non-limiting embodiments, vehicle computing system 106 increases the neighborhood search for lanes in response to determining no candidate lanes associated with a vehicle pose of the autonomous vehicle 104. As an example, vehicle computing system 106 increases the size of the neighborhood search for lanes in response to the number of candidate lanes determined in a first search.

As further shown in FIG. 5, at step 508, process 500 includes selecting a starting lane based on a score associated with the one or more candidate lanes. For example, vehicle computing system 106 selects a starting lane based on a highest score in the one or more candidate lanes. Vehicle computing system 106 selects a starting lane from the one or more candidate lanes by generating a score for the one or more candidate lanes. For example, the vehicle computing system 106, determines a score for each candidate lane, including each AV lane and each coverage lane. For example, vehicle computing system 106 determines a score based on a distance between a position of the autonomous vehicle and a closest point of the candidate lane. For example, vehicle computing system 106 determines a score based on a difference between a heading of the autonomous vehicle and a heading of the candidate lane. For example, vehicle computing system 106 determines a score based on the candidate lane in a current lane of the current route of the autonomous vehicle 104 (e.g., determined based on the pose estimate) or a future lane of the route of the autonomous vehicle 104 (e.g., determined based on a current route plan).

In some non-limiting embodiments, selecting a starting lane based on a score includes generating a score for each candidate lane that includes as a weighted sum of the distance between a position of the autonomous vehicle and a closest point of the candidate lane and the difference between a heading of the autonomous vehicle and a heading of the candidate lane.

In some non-limiting embodiments, vehicle computing system 106 determines candidate lanes that are based on a criteria of the autonomous vehicle. For example, vehicle computing system 106 determines candidate lanes that are based on an indication of whether the autonomous vehicle can travel along a heading of the one or more candidate AV lanes. For example, vehicle computing system 106 determines the candidate lanes from map data associated with an indication for each lane in the geographic location of a travel direction for the autonomous vehicle in said lane. In some non-limiting embodiments, the vehicle computing system 106 determines a candidate lane is non-viable when said candidate lane has a travel direction that is different by more than a predetermined degree from the current lane of the autonomous vehicle. In some non-limiting embodiments, the vehicle computing system 106, when determining one or more candidate lanes, one more non-viable lanes are excluded from the one or more candidate lanes.

In some non-limiting embodiments, the vehicle computing system 106 determines one or more candidate AV lanes in response to determining the autonomous vehicle 104 is on an AV lane. For example, vehicle computing system 106 determines one or more candidate AV lanes including at least one point (e.g., a geospatial coordinate) associated with a location corresponding to the location of the autonomous vehicle 104 in the geographic location.

In some non-limiting embodiments, the vehicle computing system 106 determines a candidate lane based on a search for routable lanes whose geometry contains the vehicle pose. For example, the vehicle computing system 106 determines a candidate AV lane that includes a point (e.g., a geospatial coordinate) that matches the vehicle pose estimate (e.g., LIDAR pose estimate). For example, the vehicle computing system 106 determines the candidate lane based on a calculation of the delta (e.g., variation, increment, etc.) between the vehicle heading and an approximate heading of each lane at the closest point on the nominal path. In some non-limiting embodiments, the vehicle computing system 106 determines the candidate lane by excluding one or more lanes with a delta which exceeds a threshold (e.g., 90 degrees, etc.).

In some non-limiting embodiments, the vehicle computing system 106 determines a candidate AV lane in response to finding at least one candidate AV lane that contains the vehicle pose. For example, the vehicle computing system 106 determines a candidate AV lane based on a search for AV lanes in a submap associated with the current vehicle pose of the autonomous vehicle 104 in response to not determining at least one candidate AV lane that contains the vehicle pose.

In some non-limiting embodiments, the vehicle computing system 106 determines one or more candidate lanes based on a LIDAR pose estimate in response to determining a LIDAR pose estimate is valid. In some non-limiting embodiments, the vehicle computing system 106 determines one or more candidate lanes based on a low quality pose estimate in response to determining a LIDAR pose estimate is invalid.

As further shown in FIG. 5, at step 510, process 500 includes generating at least one route plan that includes the selected starting lane of the autonomous vehicle 104. For example, autonomous vehicle 104 (e.g., vehicle computing system 106, etc.) generates a route plan based on a selected starting lane in one or more current candidate lanes of the autonomous vehicle for initiating a route (e.g., starting location, vehicle pose, etc.). In some non-limiting embodiments, vehicle computing system 106 generates one or more future lanes in the route plan of the autonomous vehicle 104 based on the current candidate lanes. For example, vehicle computing system 106 may generate a route plan from the starting lane over one of the one or more future lanes. In some non-limiting embodiments, vehicle computing system 106 generates the route plan over the one or more future lanes including a transition from the starting lane of the route plan to at least one of the one or more future lanes.

In some non-limiting embodiments, the vehicle computing system 106 generates a route plan from lanes that are based on a criteria of the autonomous vehicle associated with an indication of whether the autonomous vehicle can travel along a heading of the one or more candidate AV lanes. For example, vehicle computing system 106 generates a route plan from map data that is associated with an indication for each lane in the geographic location of a travel direction for the autonomous vehicle in said lane. In some non-limiting embodiments, the vehicle computing system 106 generates a route plan based on one or more candidate lanes that are routable, and excludes a lane that is non-viable (e.g., lane has a travel direction that is different by more than a predetermined degree from the current lane of the autonomous vehicle 104). In some non-limiting embodiments, the vehicle computing system 106, when generating a route plan from one or more candidate lanes, one more non-viable lanes are excluded from the one or more candidate lanes. In some non-limiting embodiments, vehicle computing system 106 generates the route plan to exclude each candidate lane that is non-viable.

In some non-limiting embodiments, the vehicle computing system 106 generates at least one route plan based on one or more candidate AV lanes in response to determining the autonomous vehicle 104 is on an AV lane. For example, vehicle computing system 106 generates an updated route plan based on the at least one AV lane of the one or more candidate AV lanes.

As further shown in FIG. 5, at step 512, process 500 includes controlling travel of the autonomous vehicle 104 based on one of the at least one route plan. For example, autonomous vehicle 104 (e.g., vehicle computing system 106, etc.) controls, based on the route plan, autonomous vehicle 104 to maintain a route associated with the vehicle pose based on a pose estimate of autonomous vehicle 104 in the coverage lane. For example, vehicle computing system 106 controls autonomous vehicle 104 to determine a route plan in a coverage lane in the candidate lanes based on vehicle pose estimates. In some non-limiting embodiments, vehicle computing system 106 controls autonomous vehicle 104, in response to determining a current lane of the autonomous vehicle 104, autonomous vehicle 104 determines a navigation for transitioning from the starting lane in the current candidate lanes to a future lane in the current candidate lanes. For example, vehicle computing system 106 controls autonomous vehicle 104 to navigate a route plan, while still reducing or eliminating a processing delay associated with determining a route plan, from a plurality of new current lanes based on a threshold (e.g., score from highest to lowest). For example, the vehicle computing system 106 controls the autonomous vehicle 104 to transition from a pose estimate of the autonomous vehicle 104 in a coverage lane to a LIDAR pose of the autonomous vehicle 104 in an AV lane. In some non-limiting embodiments, the vehicle computing system 106 controls the autonomous vehicle 104 to transition from a current lane in the coverage lane based on a distance from the pose estimate associated with the autonomous vehicle 104 to a future lane in the AV lane.

In some non-limiting embodiments, vehicle computing system 106 may control autonomous vehicle 104 to maintain a route plan that includes a transition from an AV lane in the current candidate lanes to a coverage lane in the current candidate lanes. For example, vehicle computing system 106 controls the autonomous vehicle to travel from a coverage lane to an AV lane. In some non-limiting embodiments, vehicle computing system 106 may control autonomous vehicle 104, in response to determining autonomous vehicle 104 is in an AV lane of the current candidate lanes. In some non-limiting embodiments, vehicle computing system 106 may control autonomous vehicle 104, in response to determining an invalid lane association based on the vehicle pose and/or the current candidate lanes. For example, vehicle computing system 106 may control autonomous vehicle 104 by navigating a route plan from a new starting lane based on a new position estimate. For example, vehicle computing system 106 can reduce delays and/or increase efficiency by controlling autonomous vehicle 104 to navigate a new starting lane in response to determining the autonomous vehicle 104 is outside the route plan (e.g., deviation from the route plan, outside the candidate lanes, etc.). For example, vehicle computing system 106 can reduce delays and/or increase efficiency by controlling autonomous vehicle 104 to navigate on a new route plan in response to determining the autonomous vehicle 104 is in a candidate lane that is outside the route plan (e.g., deviation from the route plan, outside the lane, etc.). In some non-limiting embodiments, vehicle computing system 106 may control the autonomous vehicle 104 on a route plan in response to determining a previous route plan is invalid (e.g., current candidate lanes of the current route plan are outside of a threshold distance to a vehicle pose). For example, the vehicle computing system 106 may control the autonomous vehicle 104 to determine a route plan (e.g., new route plan, updated route plan) as the vehicle traverses a previously determined current route plan (e.g. re-planning a route).

In some non-limiting embodiments, autonomous vehicle 104 (e.g., vehicle computing system 106, etc.) controls the autonomous vehicle 104 on a route plan, in response to determining a coverage lane position (e.g., within, within a distance, an estimated travel time, etc.), to maintain at least one functionality associated with the fully-autonomous mode. In some non-limiting embodiments, vehicle computing system 106 controls autonomous vehicle 104 to transition from an AV lane to a coverage lane. For example, vehicle computing system 106, when controlling autonomous vehicle 104 to transition from an AV lane to a coverage lane, transitions from a LIDAR-based pose of the autonomous vehicle for determining a current lane to a vehicle pose based on a pose estimate for determining a current candidate lane in a coverage lane.

Figure 6:
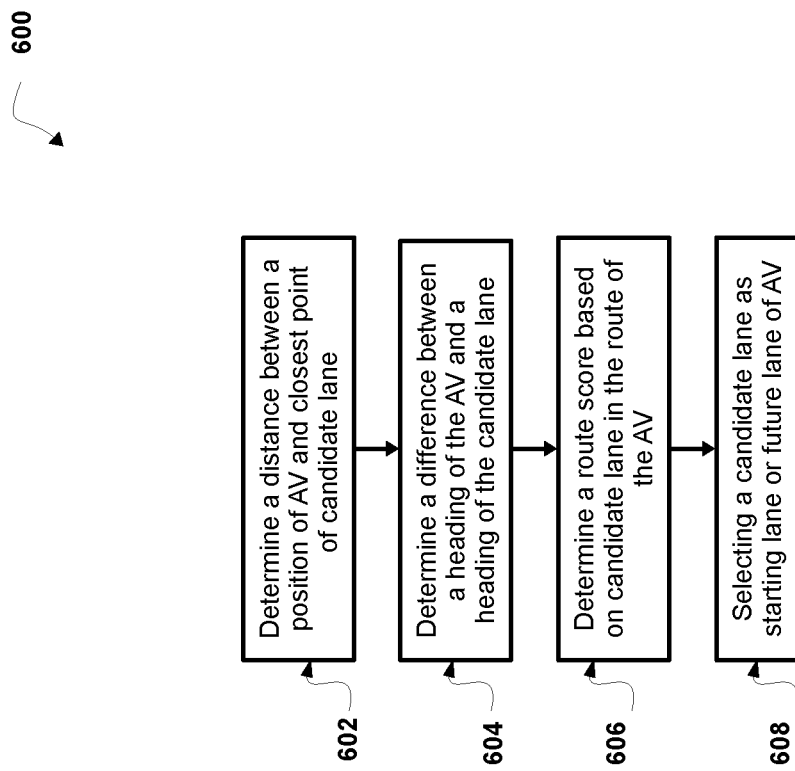
FIG. 6 is a flowchart of a non-limiting embodiment of a process for determining a route plan.

Referring now to FIG. 6, FIG. 6 is a flowchart of a non-limiting embodiment of a process 600 for determining a score for a candidate lane. In some non-limiting embodiments, one or more of the steps of process 600 are performed (e.g., completely, partially, etc.) by autonomous vehicle 104 (e.g., one or more devices of autonomous vehicle 104). In some non-limiting embodiments, one or more of the steps of process 600 are performed (e.g., completely, partially, etc.) by another device or a group of devices separate from or including autonomous vehicle 104, such service system 102 (e.g., one or more devices of service system 102). For example, the score for the candidate lane is determined by autonomous vehicle 104 as the weighted sum of three component scores, each of which is scaled from 0-1, where 0 is the least well matched to the pose and 1 is the most well matched to the vehicle pose.

As shown in FIG. 6, at step 602, process 600 includes determining a distance between a position of the autonomous vehicle 104 and a closest point of the candidate lane. For example, vehicle computing system 106 determines a distance from the autonomous vehicle 104 to a closest point on the candidate lane's nominal path. In some non-limiting embodiments, the distance score is scaled as a fraction of the search radius.

As further shown in FIG. 6, at step 604, process 600 includes determining a difference between a heading of the autonomous vehicle 104 and a heading of the candidate lane. For example, autonomous vehicle 104 (e.g., vehicle computing system 106, etc.) determines, based on map data and/or route data, a delta (e.g., variation, increment, etc.) between a heading associated with autonomous vehicle 104 and the heading (e.g., an approximation) of the lane at the closest point on the route (e.g., nominal path). In some non-limiting embodiments, the vehicle computing system 106 determines a difference based on a scale (e.g., scaled from 0.0-1.0 as a fraction of 180 degrees).

In some non-limiting embodiments, autonomous vehicle 104 determines an indication for each lane in the geographic location of a travel direction for the autonomous vehicle 104 in said lane. For example, autonomous vehicle 104 determines that a respective candidate lane is non-viable in response to determining that the respective candidate lane is outside a threshold criterion. For example, autonomous vehicle 104 determines a travel direction that is different by more than a predetermined degree from the starting lane of the autonomous vehicle, a lateral distance greater than a threshold distance, a vertical distance greater than a threshold distance, and/or the like. In some non-limiting embodiments, autonomous vehicle 104 selects a starting lane from the one or more candidate lanes, by first excluding candidate lanes that are non-viable. For example, the one or more non-viable candidate lanes are excluded from selection as a starting lane of a new route plan. In some non-limiting embodiments, autonomous vehicle 104 determines a non-viable candidate based on a lateral distance threshold and a vertical distance threshold. For example, autonomous vehicle 104 determines these thresholds for candidates other than the best scored candidate. For example, if autonomous vehicle 104 determines zero candidates which meet the threshold, the lane associator will still return the best scored candidate; in this way, that candidate may not be able to be immediately engaged in autonomy if it fails those thresholds, however, at least the navigation system will be able to produce a route which could be engaged as soon as the vehicle operator corrects the orientation of the vehicle.

As further shown in FIG. 6, at step 606, process 600 includes determining a route score based on a candidate lane in the route of the autonomous vehicle. In some non-limiting embodiments, vehicle computing system 106 determines a distance including an expected route score. For example, vehicle computing system 106 determines an expected route score of 1.0 in response to a lane in the previously known current lane or in the next expected lane in the current route. In some non-limiting embodiments, the vehicle computing system determines a linear gradient for scaling down to 0.0 for lanes that are further ahead (e.g., transitions in the route plan, steps, hops, etc.) by a number of lanes. In some non-limiting embodiments, vehicle computing system 106 may include a predetermined number of lanes further ahead. In some non-limiting embodiments, vehicle computing system 106 determines 0.0 for all lanes if there is no current route. For example, for the heading score, 0 means the vehicle is facing the exact opposite direction (180 degree delta) and 1 means the vehicle is facing the exact same direction.

As further shown in FIG. 6, at step 608, process 600 includes selecting the candidate lane as a starting lane of a route plan of the autonomous vehicle 104 or a future lane of a route plan of the autonomous vehicle 104. In some non-limiting embodiments, vehicle computing system 106 selects a starting lane of the autonomous vehicle for initiating a route (e.g., starting location, current vehicle pose, etc.) based on a result and/or score associated with at least one of steps 602-606 or any combination thereof. In some non-limiting embodiments, vehicle computing system 106 determines one or more future lanes of travel from the selected starting lane for the autonomous vehicle 104.

In some non-limiting embodiments, vehicle computing system 106 determines one or more candidate lanes in response to determining one or more lanes containing a LIDAR pose estimate. In some non-limiting embodiments, vehicle computing system 106 determines a current candidate lane based on a score. For example, vehicle computing system 106 determines a single highest-scored candidate in response to determining a LIDAR pose estimate is not included in a lane. In some non-limiting embodiments, when determining a current candidate lane, in response to determining a plurality of current candidate lanes, vehicle computing system 106 determines an order (e.g., sorts) of a set of selected lane candidates based on the score. For example, vehicle computing system 106 determines the set based on the highest scoring lane first and lowest scoring lane last.

For example, vehicle computing system 106 may determine a route plan over one of the one or more future lanes. In some non-limiting embodiments, vehicle computing system 106 determines the route plan over the one or more candidate lanes including a transition from the starting lane to at least one of the one or more future lanes.

Referring now to FIGS. 7A-7D, FIGS. 7A-7D are diagrams of an overview of a non-limiting embodiment of an implementation 700 relating to a process for controlling an autonomous vehicle 704. As shown in FIGS. 7A-7D, implementation 700 may include autonomous vehicle 704, vehicle computing system 712, and vehicle controls 718. In some non-limiting embodiments, autonomous vehicle 704 may be the same or similar to autonomous vehicle 104. In some non-limiting embodiments, vehicle computing system 712 may be the same or similar to vehicle computing system 106. In some non-limiting embodiments, vehicle controls 718 may be the same or similar to vehicle controls 226.

Figure 7A:
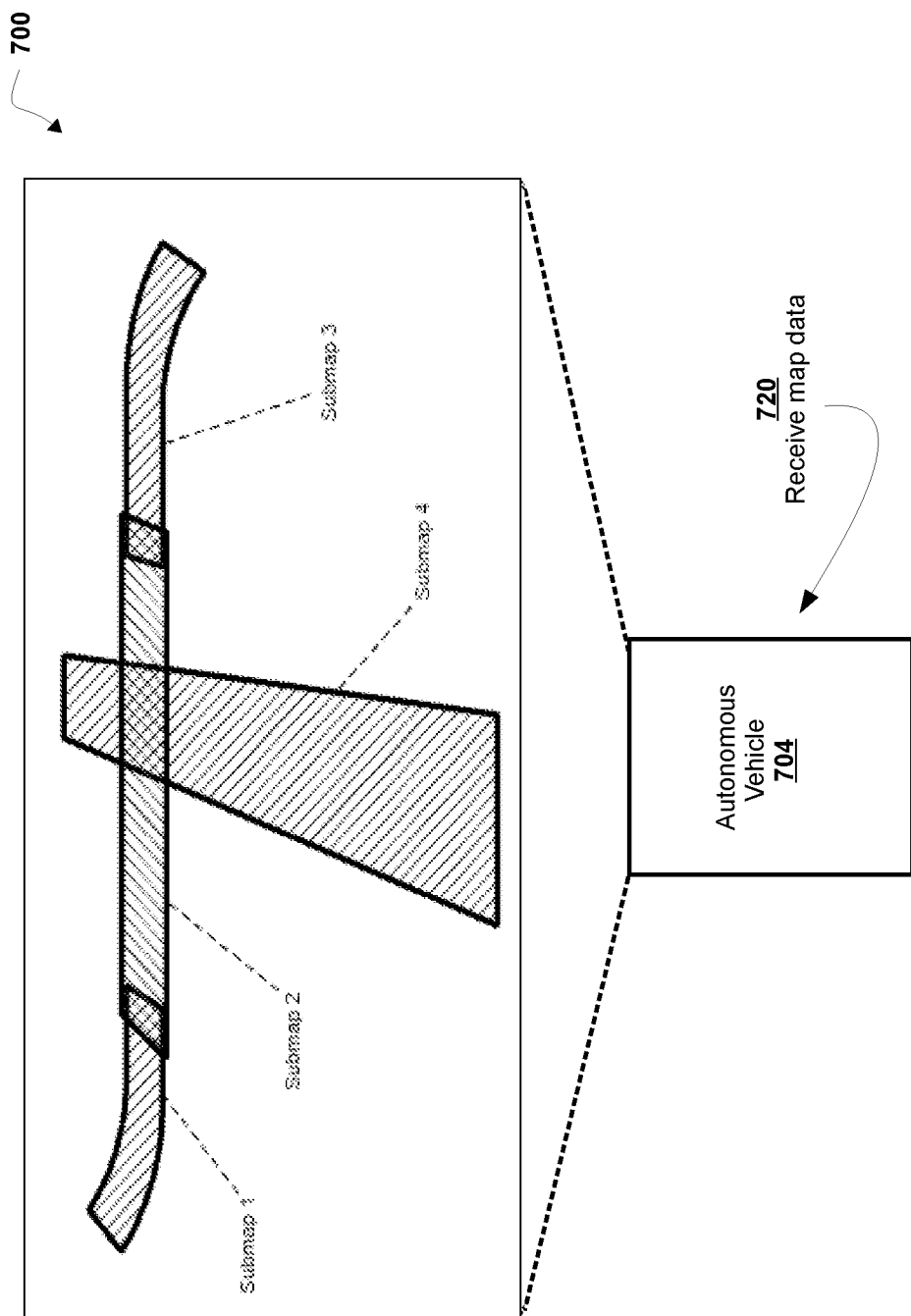

As shown by reference number 720 in FIG. 7A, autonomous vehicle 704 receives map data associated with a map of a geographic location. In some non-limiting embodiments, the map includes a plurality of submaps where an autonomous vehicle 704 can travel (e.g., submap 1, submap 2, submap 3, and submap 4). In some non-limiting embodiments, the map includes (i) a coverage lane where autonomous vehicle 704 can operate and/or travel under a partially-autonomous mode or a manual mode, and (ii) an AV lane where autonomous vehicle 704 can operate and/or travel under a fully-autonomous mode, and the coverage lane is linked to the AV lane.

As shown by reference number 725 in FIG. 7B, autonomous vehicle 704 (e.g., vehicle computing system 712, etc.) obtains position estimate data associated with a position estimate of the autonomous vehicle 704 in the geographic location. In addition, autonomous vehicle 704 determines a route of the autonomous vehicle 704 including a subset of submaps (e.g., submap 1, submap 2, and submap 3) in the plurality of submaps (e.g., submap 1, submap 2, submap 3, and submap 4).

Figure 7C:
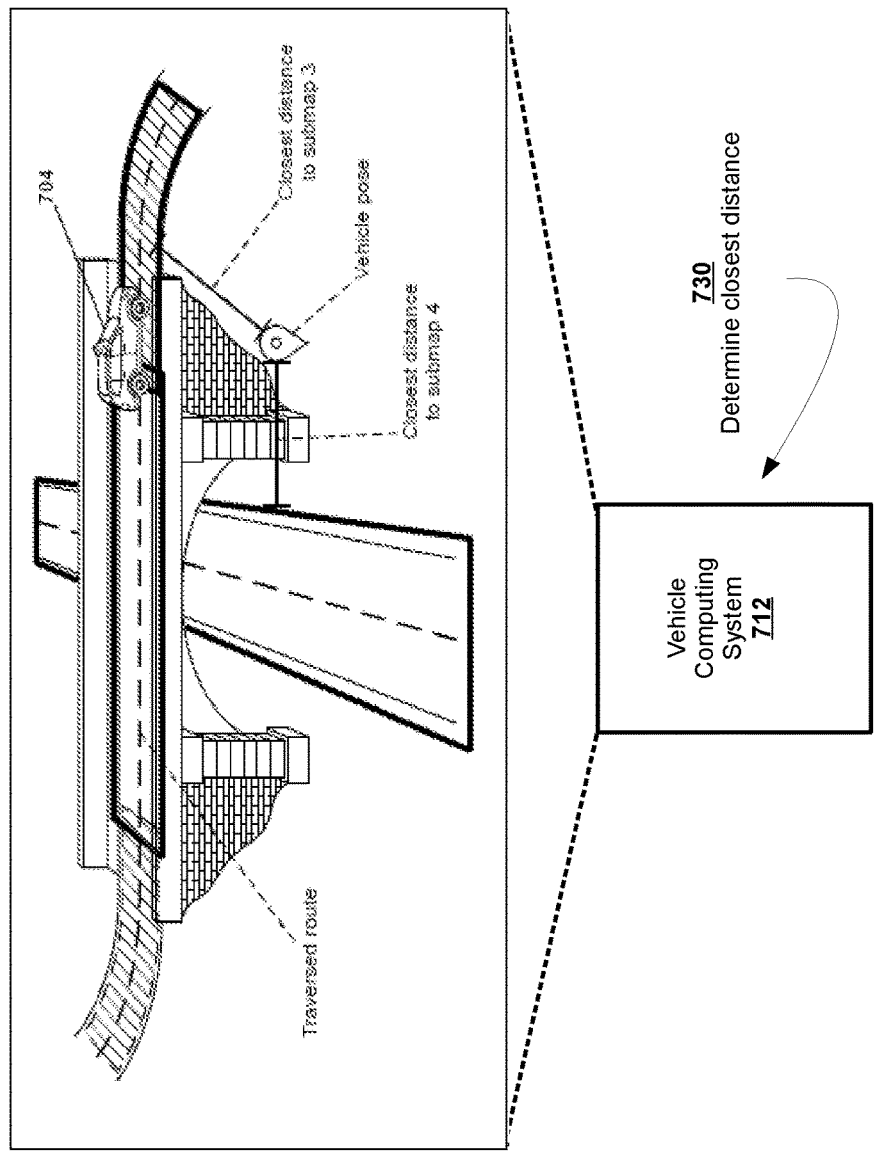

As shown by reference number 730 in FIG. 7C, vehicle computing system 712 determines a first submap in the subset of submaps of the route closest to the position estimate of the autonomous vehicle 704. For example, as shown, submap 3 is a submap in the subset of submaps of the route that is closest to the position estimate of the autonomous vehicle 704. In addition, submap 3 is the submap in the subset of submaps that is closest to the position estimate of the autonomous vehicle 704. In some non-limiting embodiments, the vehicle computing system 712 determines a second submap outside the subset of submaps of the route closest to the position estimate of the autonomous vehicle 704. For example, submap 4 is the second submap outside the subset of submaps of the route (e.g., submap 1, submap 2, and submap 3) closest to the position estimate of the autonomous vehicle 704.

Figure 7D:
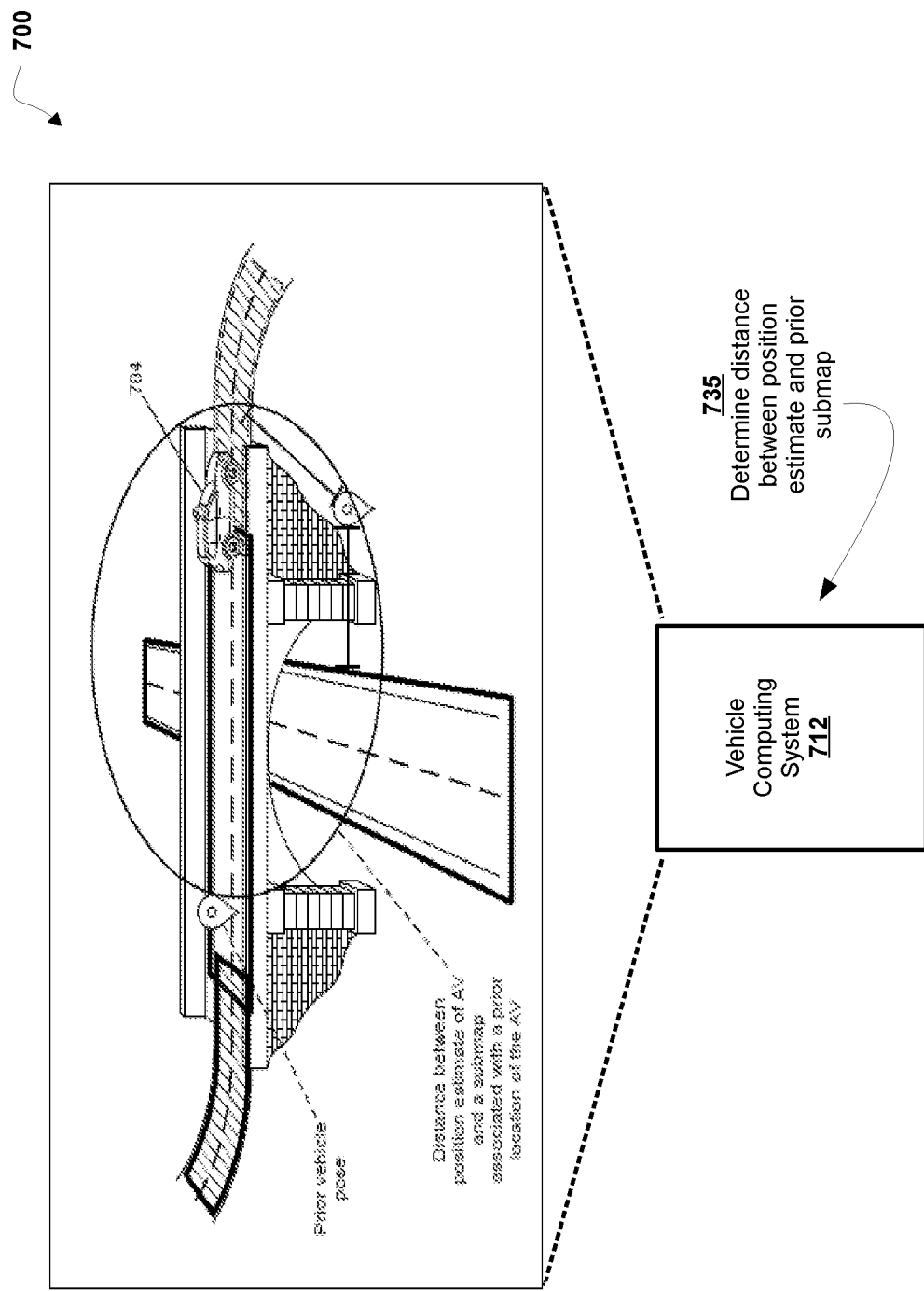

As shown by reference number 735 in FIG. 7D, vehicle computing system 712 determines distance between position estimate and prior submap. For example, a distance is determined between the position estimate of the autonomous vehicle 704 and a submap of the prior vehicle pose. In this way, a position estimate of the autonomous vehicle 704 is determined based on a previous position estimate. For example, if the position estimate is outside a threshold, vehicle computing system 712 determines that a position estimate of the autonomous vehicle 704 is invalid.

Figure 7E:
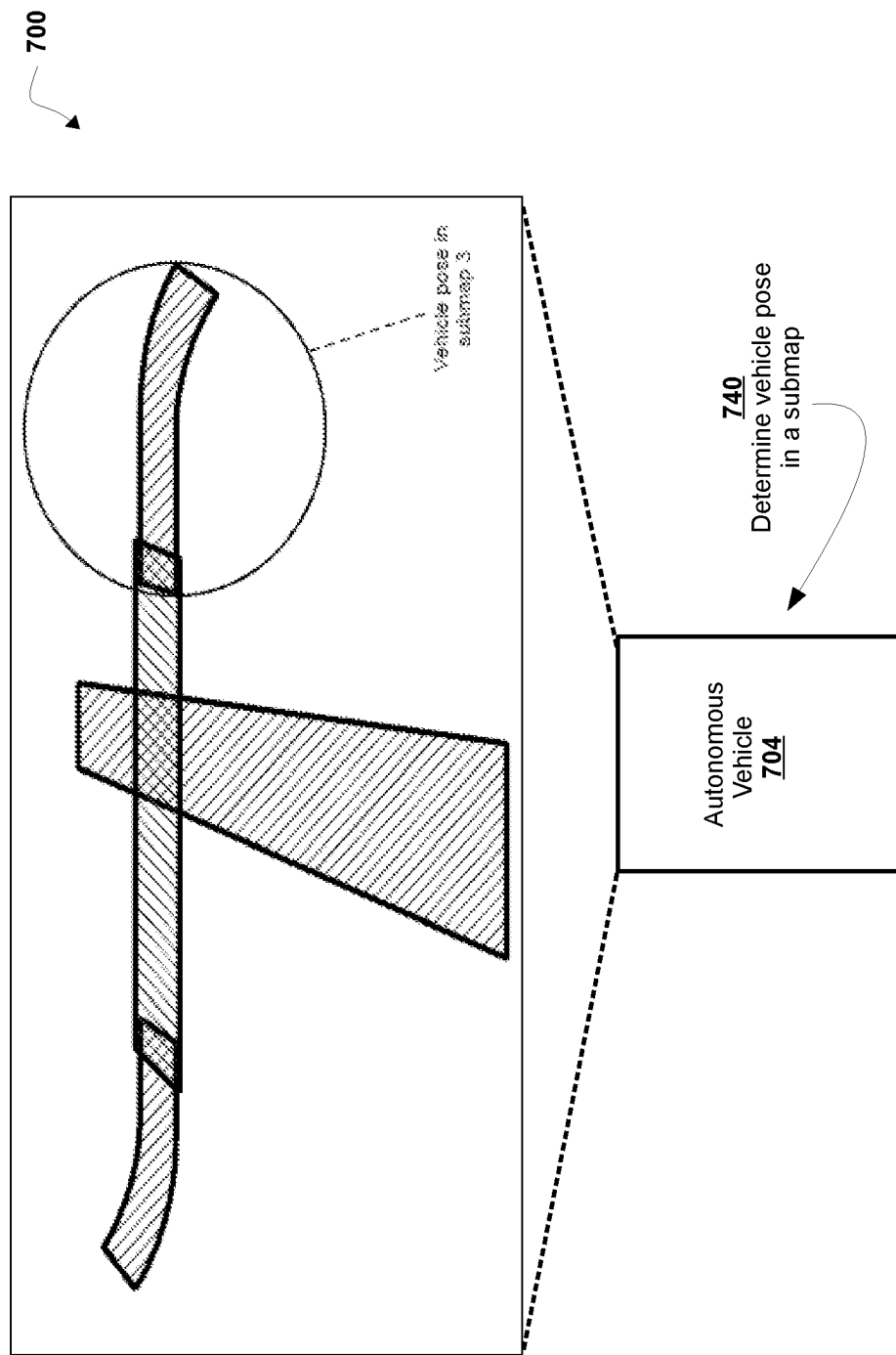

As shown by reference number 740 in FIG. 7E, vehicle computing system 712 determines a vehicle pose in a submap. For example, as shown, vehicle computing system 712 determines that the first submap satisfies a threshold based on the distance between the position estimate of the autonomous vehicle 704 and submap 1 associated with the prior pose. In this way, the vehicle computing system 712 as shown in FIG. 7E, determines a vehicle pose in submap 3 based on the position estimate data and the projection point (e.g., GPS coordinates, geospatial coordinates, etc.).

Figure 7F:
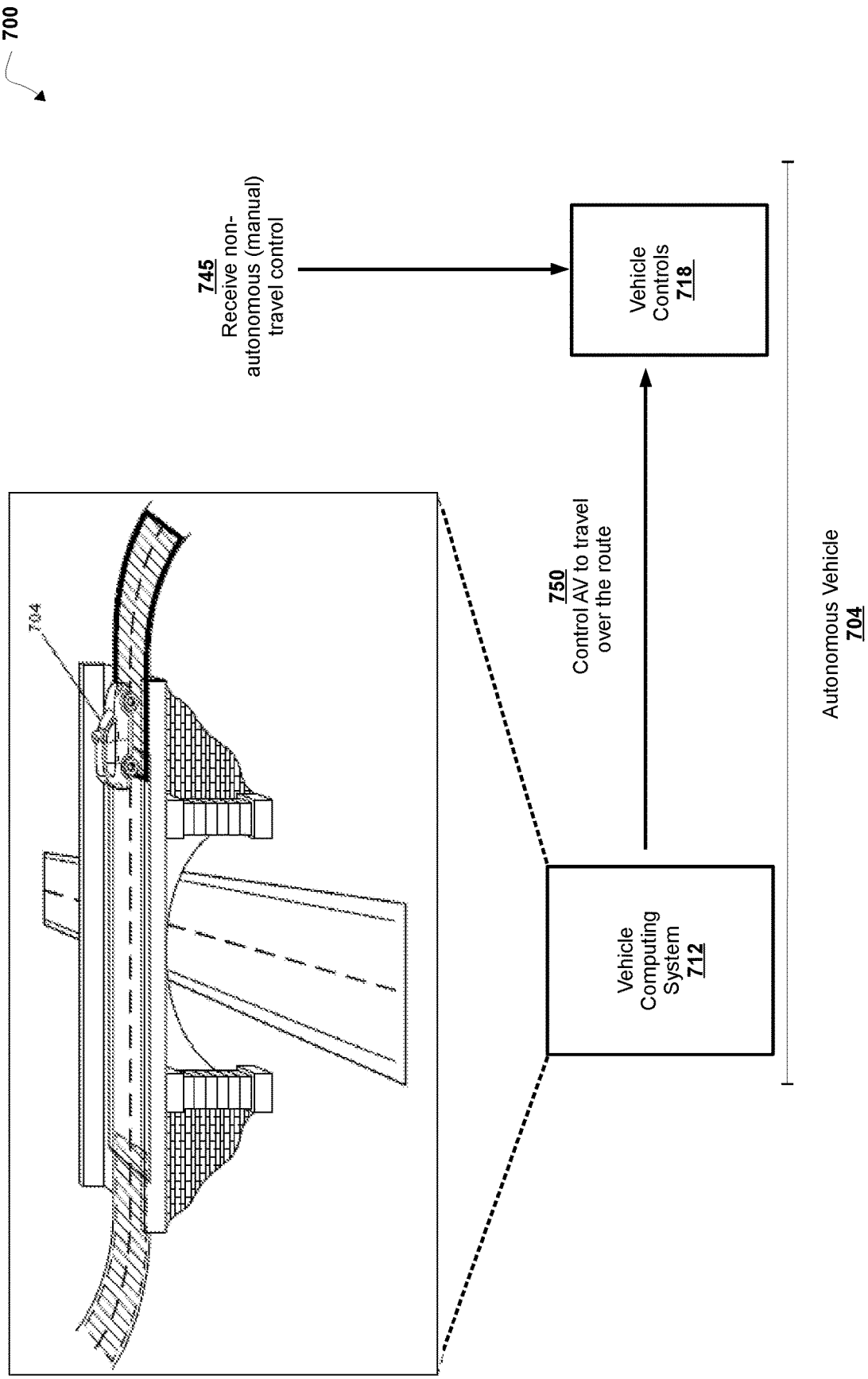

As shown by reference number 750 in FIG. 7F, vehicle computing system 712 controls the autonomous vehicle 704 to travel in non-autonomous mode over the route For example, vehicle computing system 712 reduces or eliminates an initialization time, a boot time, a bootstrapping time, and/or the like associated with a functionality and/or system of the fully-autonomous mode initializing, booting, bootstrapping and/or the like before fully-autonomous travel can begin by maintaining and/or continuing processing and/or execution of the functionality or system in the partially-autonomous mode or the manual mode during partially-autonomous operation and/or travel or manual, non-autonomous operation and/or travel of the autonomous vehicle 704 in the coverage lane.

Referring now to FIGS. 8A-8D, FIGS. 8A-8D are diagrams of an overview of a non-limiting embodiment of an implementation 800 relating to a process for controlling an autonomous vehicle 804 based on a route plan. As shown in FIGS. 8A-8D, implementation 800 may include autonomous vehicle 804, vehicle computing system 812, and vehicle controls 818. In some non-limiting embodiments, autonomous vehicle 804 may be the same or similar to autonomous vehicle 104. In some non-limiting embodiments, vehicle computing system 812 may be the same or similar to vehicle computing system 106. In some non-limiting embodiments, vehicle controls 818 may be the same or similar to vehicle controls 226.

Figure 8A:
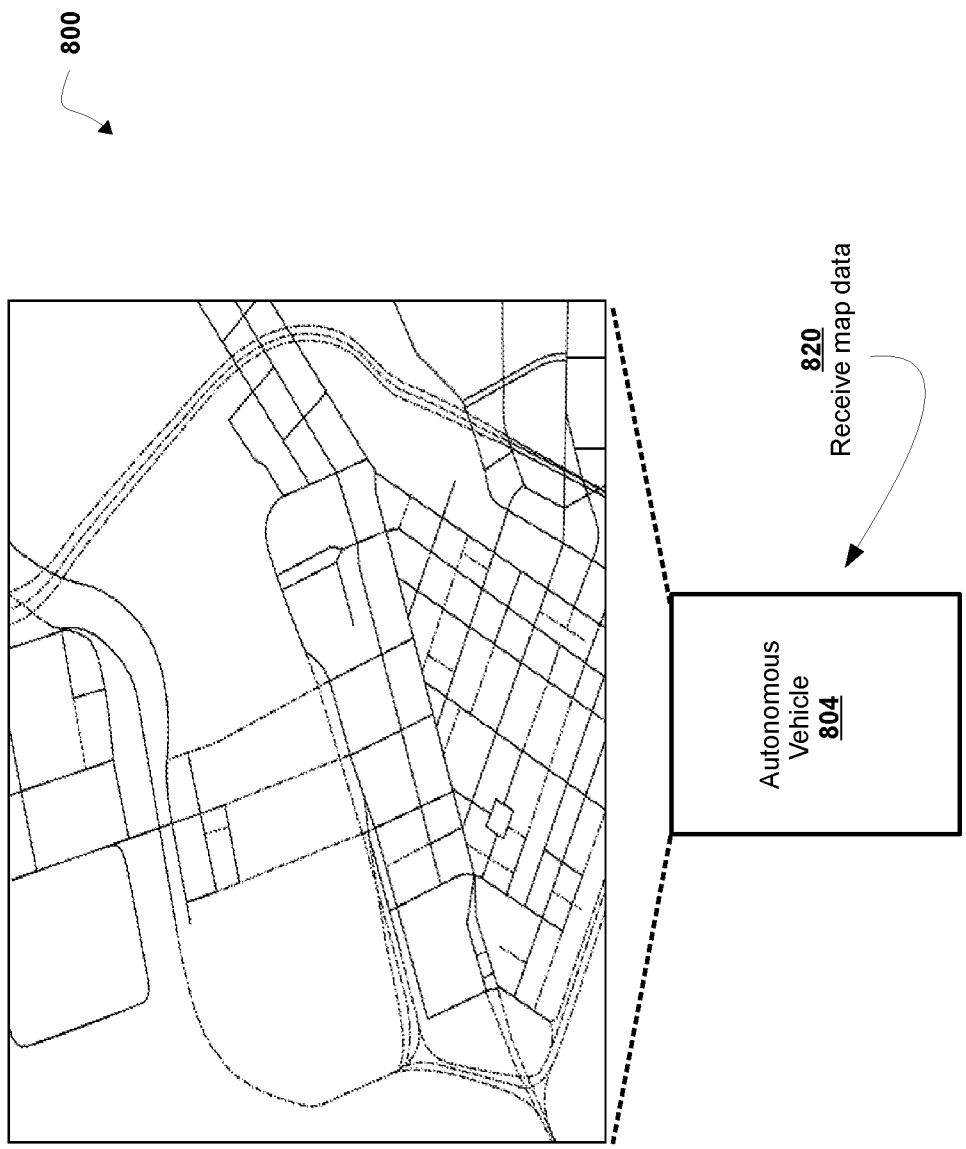
FIGS. 8A-8D are diagrams of an implementation of a non-limiting embodiment of a process disclosed herein.

As shown by reference number 820 in FIG. 8A, autonomous vehicle 804 receives map data associated with a map of a geographic location. In some non-limiting embodiments, the map includes (i) a coverage lane where autonomous vehicle 804 can operate and/or travel under a partially-autonomous mode or a manual mode, and (ii) an AV lane where autonomous vehicle 804 can operate and/or travel under a fully-autonomous mode, and the coverage lane is linked to the AV lane. In some non-limiting embodiments, autonomous vehicle 804 may not be capable of determining a vehicle pose based on autonomous vehicle data. For example, autonomous vehicle 804 may not be capable of determining a vehicle pose based on LIDAR data.

Figure 8B:
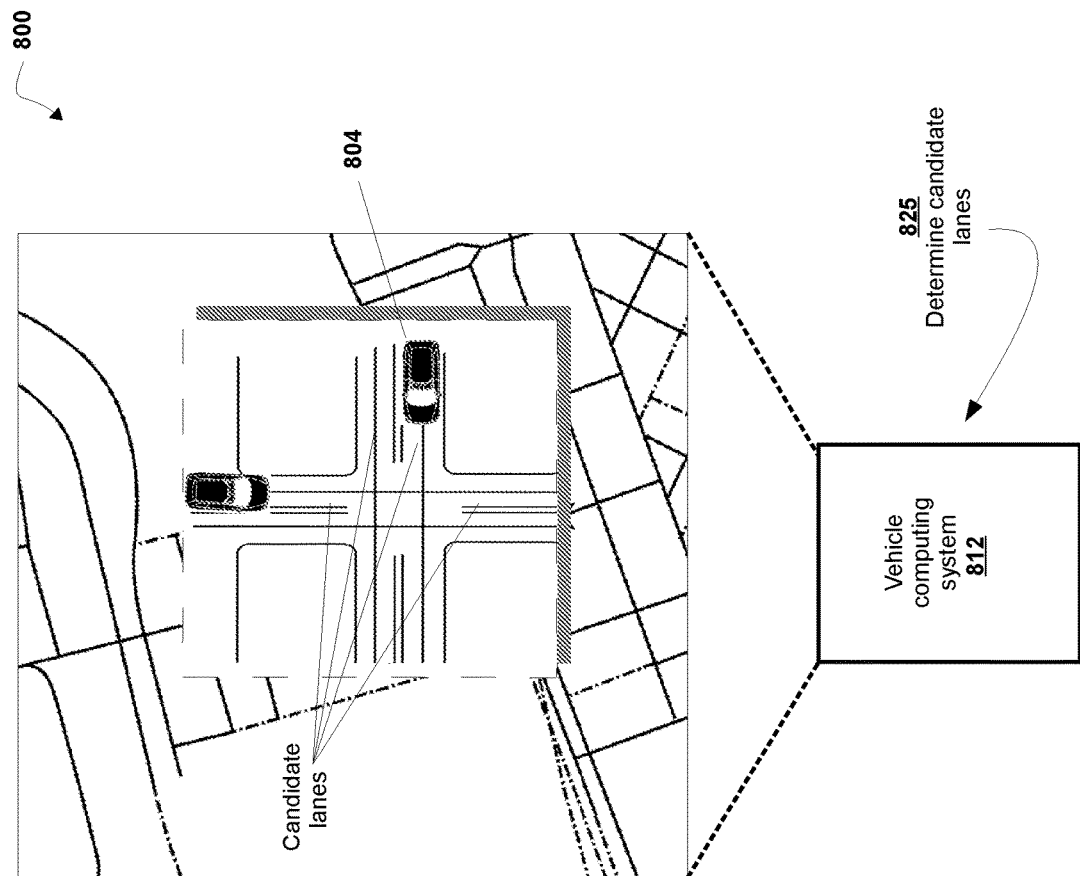

As shown by reference number 825 in FIG. 8B, autonomous vehicle 804 (e.g., vehicle computing system 812, etc.)

determines candidate lanes based on a vehicle pose in a coverage lane or an AV lane of the geographic location based on the map data and a vehicle pose estimate (e.g., low quality pose estimate, LIDAR based estimate, etc.). For example, autonomous vehicle 804 may receive pose data based on a low quality pose estimate associated with a location of the autonomous vehicle 804 in the geographic location. The autonomous vehicle 804 determines a vehicle pose estimate at a geographic location of the autonomous vehicle 804 relative to a point in the map. Autonomous vehicle 804, in response to determining the vehicle pose estimate (e.g., current vehicle pose), determines one or more candidate lanes based on the current vehicle pose estimate in the geographic location. For example, the one or more candidate lanes may include all lanes based on a search for candidate lanes within a threshold distance of the vehicle pose estimate of the autonomous vehicle 804. For example, vehicle computing system 812 of autonomous vehicle 804 determines candidate lanes based on a search for lanes in a submap associated with the current vehicle pose of the autonomous vehicle 804. In some non-limiting embodiments, vehicle computing system 812 determines candidate lanes based on a search for lanes in the neighborhood of a submap associated with the current vehicle pose of the autonomous vehicle 804. For example, the vehicle computing system 812 determines one or more candidate lanes based on a distance between a position of the autonomous vehicle and a closest point (e.g., latitude and longitude coordinate, etc.) of the lane. In some non-limiting embodiments, the vehicle computing system 812 increases the neighborhood search for lanes in response to determining no candidate lanes.

Figure 8C:
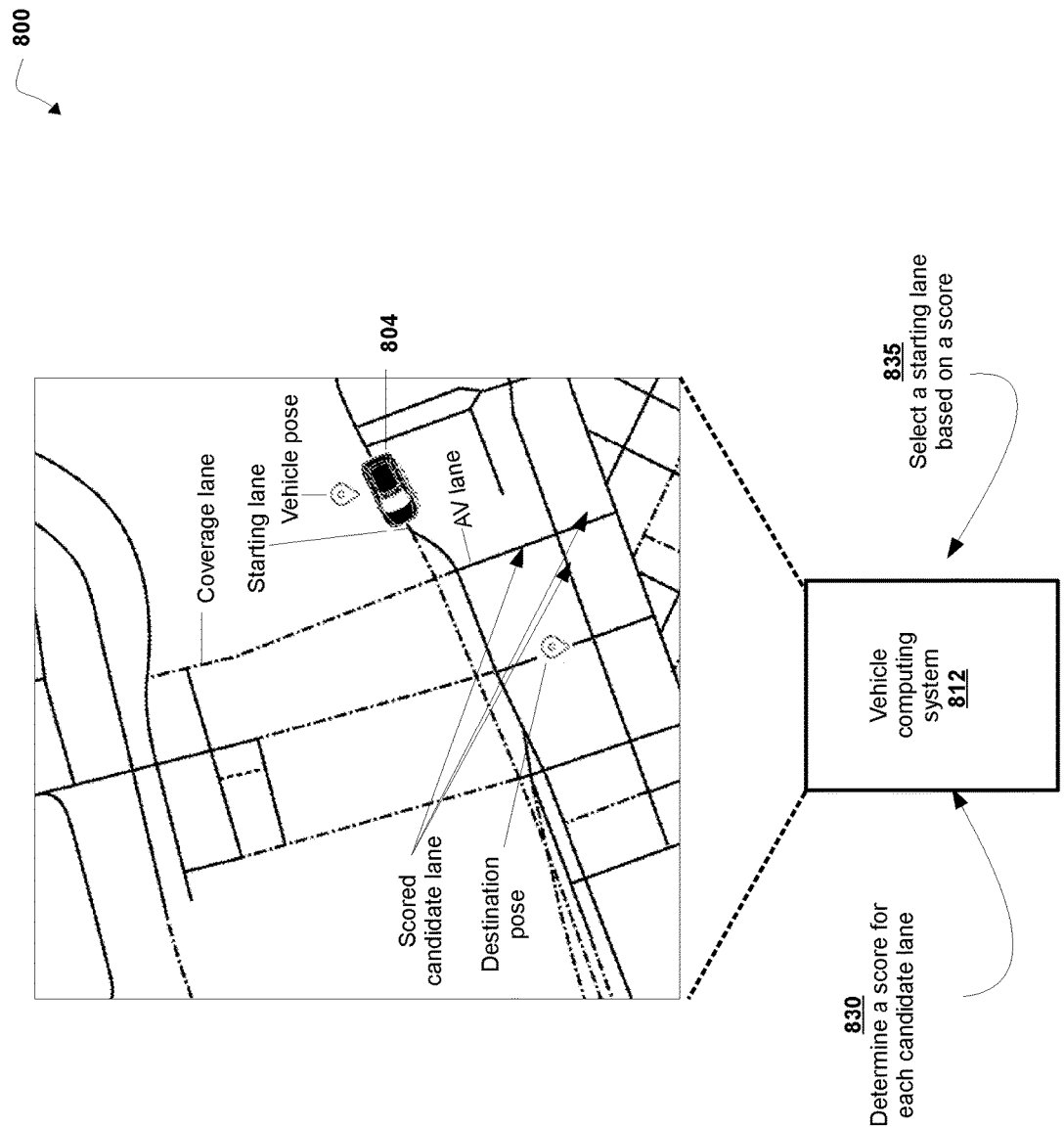

As shown by reference number 830 in FIG. 8C, vehicle computing system 812 determines a score for each of the respective candidate lanes. In some non-limiting embodiments, the vehicle computing system 812 determines a score for the one or more candidate lanes within a distance of the pose estimate associated with the autonomous vehicle 804.

In some non-limiting embodiments, vehicle computing system 812 may determine a starting lane and/or futures lanes based on the score for each of the respective candidate lanes. In some non-limiting embodiments, autonomous vehicle 804 may determine a route plan based on receiving a destination pose (e.g., trip drop-off, future lane, or determined deviation from a planned route) for the autonomous vehicle 804. For example, vehicle computing system 812 may determine a starting lane and/or futures lanes based on the score for each of the respective candidate lanes on a route to a destination pose for the autonomous vehicle 804.

Figure 8D:
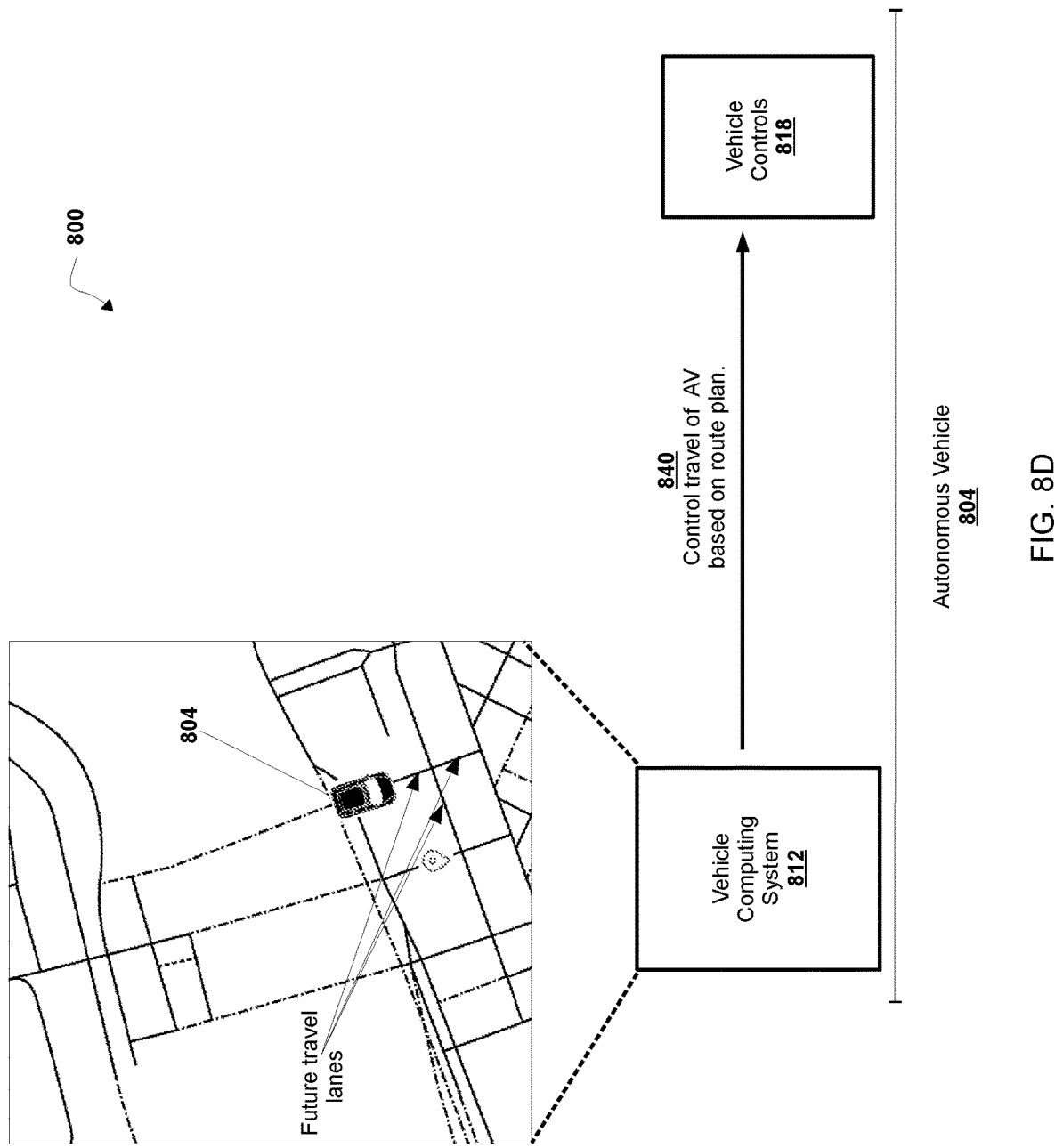

As shown by reference number 840 in FIG. 8D, vehicle computing system 812 controls travel of the autonomous vehicle 804 in the current lane and future lanes of a route plan. For example, vehicle computing system 812 controls one or more vehicle controls 818 of the autonomous vehicle 804 (e.g., AV localization, route planning, routing, etc.) of autonomous vehicle 804 based on the map data to control operation and/or travel of autonomous vehicle 804 along a route plan in the coverage lane. For example, the vehicle computing system 812 may control travel of autonomous vehicle 804 in a coverage lane of at least one route plan based on the one or more candidate lanes and a starting lane under the partially-autonomous mode or the manual mode (e.g., during partially-autonomous travel or manual, non-autonomous travel of the autonomous vehicle 804 in the coverage lane); in this way, vehicle computing system 812 reduces or eliminates a processing delay associated with route planning of autonomous vehicle 804 in a coverage lane. For example, vehicle computing system 812 maintains and/or continues processing and/or execution of the route planning functionality or system in the partially-autonomous mode or the manual mode during partially-autonomous operation and/or travel or manual, non-autonomous operation and/or travel of the autonomous vehicle 804 in the coverage lane until the vehicle computing system 812 controls travel of autonomous vehicle 804 to transition from a coverage lane of at least one route plan to an AV lane of the at least one route plan.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed:
1. An autonomous vehicle comprising:
a vehicle computing system comprising one or more processors, wherein the vehicle computing system is configured to:
receive map data associated with a map of a geographic location, the map comprising (i) a coverage lane where the autonomous vehicle can travel under a partially- autonomous mode or a manual mode, and (ii) an AV lane where the autonomous vehicle can travel under a fully-autonomous mode;

receive pose data based on a pose estimate associated with a location of the autonomous vehicle in the geographic location;

determine one or more candidate lanes within a distance of the pose estimate associated with the autonomous vehicle;

select, based on a score, a starting lane from the one or more candidate lanes;

generate a route plan that includes the selected starting lane; and control travel of the autonomous vehicle based on the route plan.

2. The autonomous vehicle of claim 1, wherein the vehicle computing system is further configured to:

determine based on the starting lane that the autonomous vehicle is on the coverage lane; and control travel of the autonomous vehicle based on the route plan, by controlling the autonomous vehicle in the coverage lane where the autonomous vehicle can travel under a partially-autonomous mode or a manual mode.

3. The autonomous vehicle of claim 1, wherein the vehicle computing system is further configured to:

receive updated pose data based on a LIDAR pose estimate of the autonomous vehicle in the geographic location;

determine one or more updated candidate lanes within a distance of the LIDAR pose estimate associated with the autonomous vehicle;

select, based on a second score, a second starting lane from the one or more updated candidate lanes, in response to determining that the updated candidate lanes are not in the route plan;

determine, based on the selected second starting lane, that the autonomous vehicle is on the AV lane; generate an updated route plan that includes the second selected starting lane; and control travel of the autonomous vehicle based on the updated route plan in the fully-autonomous mode.

4. The autonomous vehicle of claim 1, wherein the map data is associated with an indication for each lane in the geographic location of a travel direction for the autonomous vehicle in said lane, the vehicle computing system is further configured to:

for each respective candidate lane of the one or more candidate lanes, determine that a respective candidate lane is non-viable in response to determining that said respective candidate lane includes: a travel direction that is different by more than a predetermined degree from the starting lane of the autonomous vehicle, a lateral distance greater than a threshold distance, a vertical distance greater than a threshold distance, or any combination thereof; and select, based on a score, by selecting a starting lane from the one or more candidate lanes, excluding candidate lanes that are non-viable.

5. The autonomous vehicle of claim 1, wherein the score for selecting a starting lane is a weighted sum of: (i) a distance score based on the distance between a position of the autonomous vehicle and a closest point of the candidate lanes driving path, (ii) a heading score based on the difference between a heading of the autonomous vehicle and a heading at the closest point in a driving path of the candidate lane, and (iii) a route score based on the candidate lane including the starting lane of the autonomous vehicle and/or one of the one or more candidate future lanes in the route of the autonomous vehicle.

6. The autonomous vehicle of claim 1, wherein the vehicle computing system is configured to control the autonomous vehicle to transition from a pose estimate of the autonomous vehicle in the coverage lane to a LIDAR pose of the autonomous vehicle in the AV lane.

7. The autonomous vehicle of claim 3, wherein the vehicle computing system is configured to control the autonomous vehicle to transition from the selected starting lane in the coverage lane to a future lane in the AV lane in the one or more updated candidate lanes.

8. The autonomous vehicle of claim 1, wherein the vehicle computing system, is configured to:

generate a score for the one or more candidate lanes; and select the starting lane of the autonomous vehicle from the one or more candidate lanes based at least in part on the highest score.

9. The autonomous vehicle of claim 1, wherein the vehicle computing system is configured to:

determine one or more future lanes of the autonomous vehicle from the one or more candidate lanes; and generate the route plan comprising a transition from the selected starting lane to at least one of the one or more future lanes.

10. A method comprising:

receiving, with a computer system comprising one or more processors, map data associated with a map of a geographic location, the map comprising (i) a coverage lane where the autonomous vehicle can travel under a partially-autonomous mode or a manual mode, and (ii) an AV lane where the autonomous vehicle can travel under a fully-autonomous mode;

receiving, with the computer system, pose data based on a pose estimate associated with a location of the autonomous vehicle in the geographic location;

determining one or more candidate lanes within a distance of the pose estimate associated with the autonomous vehicle;

selecting, with the computer system, based on a score, a starting lane from the one or more candidate lanes;

generating, with the computer system, a route plan that includes the selected starting lane; and controlling, with the computer system, travel of the autonomous vehicle based on the route plan.

11. The method of claim 10, further comprising:

determining, with the computer system, based on the starting lane that the autonomous vehicle is on the coverage lane; and controlling, with the computer system, travel of the autonomous vehicle based on the route plan, by controlling the autonomous vehicle in a coverage lane where the autonomous vehicle can travel under a partially-autonomous mode or a manual mode.

12. The method of claim 10, comprising:

receiving, with the computer system, updated pose data based on a LIDAR pose estimate of the autonomous vehicle in the geographic location;

determining, with the computer system, one or more updated candidate lanes within a distance of the LIDAR pose estimate associated with the autonomous vehicle;

selecting, with the computer system, based on a second score, a second starting lane from the one or more updated candidate lanes, in response to determining that the updated candidate lanes are not in the route plan;

determining, with the computer system, based on the selected second starting lane, that the autonomous vehicle is on the AV lane;

generating, with the computer system, an updated route plan that includes the second selected starting lane; and controlling travel of the autonomous vehicle, with the computer system, based updated route plan in the fully-autonomous mode.

13. The method of claim 10, wherein the map data is associated with an indication for each lane in the geographic location of a travel direction for the autonomous vehicle in said lane, the method further comprising:

for each respective candidate lane of the one or more candidate lanes, determining, with the computer system, that a respective candidate lane is non-viable in response to determine that said respective candidate lane includes: a travel direction that is different by more than a predetermined degree from the starting lane of the autonomous vehicle; and selecting, with the computer system, based on a score, by selecting a starting lane from the one or more candidate lanes excluding candidate lanes that are non-viable.

14. The method of claim 13, wherein the score for selecting a starting lane is a weighted sum of: (i) a distance score based on the distance between a position of the autonomous vehicle and a closest point of the candidate lanes driving path, (ii) a heading score based on the difference between a heading of the autonomous vehicle and a heading at the closest point in a driving path of the candidate lane and (iii) a route score based on the candidate lane including the starting current lane of the autonomous vehicle and/or one of the one or more candidate future lanes in the route of the autonomous vehicle.

15. The method of claim 10, further comprising:
controlling the autonomous vehicle to transition from a pose estimate of the autonomous vehicle in a coverage lane to a LIDAR pose of the autonomous vehicle in an AV lane.

16. The method of claim 12, further comprising:
controlling the autonomous vehicle to transition from the selected starting lane in the coverage lane to a future lane in the AV lane in the one or more updated candidate lanes.

17. The method of claim 10, further comprising:
generating a score for the one or more candidate lanes; and selecting the starting lane of the autonomous vehicle from the one or more candidate lanes based at least in part on the highest score.

18. The method of claim 10, further comprising:
determining, with the computer system, one or more future lanes of the autonomous vehicle from the one or more candidate lanes; and generating, with the computer system, the route plan comprising a transition from the selected starting lane to at least one of the one or more future lanes.

19. A computing system comprising:
one or more processors configured to:
receive map data associated with a map of a geographic location, the map comprising (i) a coverage lane where the autonomous vehicle can travel under a partially-autonomous mode or a manual mode, and (ii) an AV lane where the autonomous vehicle can travel under a fully-autonomous mode;

receive pose data based on a pose estimate associated with a location of the autonomous vehicle in the geographic location;

determine one or more candidate lanes within a distance of the pose estimate associated with the autonomous vehicle;

select, based on a score, a starting lane from the one or more updated candidate lanes, in response to determining that the updated candidate lanes are not in the route plan;

generate a route plan that includes the selected starting lane; and control travel of the autonomous vehicle based on the route plan.

20. The system of claim 19, wherein the one or more processors are configured to:
receive updated pose data based on a LIDAR pose estimate of the autonomous vehicle in the geographic location;

determine one or more updated candidate lanes within a distance of the LIDAR pose estimate associated with the autonomous vehicle;

select, based on a second score, a second starting lane from the one or more candidate lanes;

determine, based on the selected second starting lane, that the autonomous vehicle is on the AV lane;

generate an updated route plan that includes the second selected starting lane; and control travel of the autonomous vehicle based on the updated route plan in the fully-autonomous mode.

* * * * *